United States Patent
Marti et al.

(10) Patent No.: US 10,255,930 B2
(45) Date of Patent: Apr. 9, 2019

(54) WIRELESS CONTROL OF LINKED DEVICES

(71) Applicant: HARMAN INTERNATIONAL INDUSTRIES, INC., Stamford, CT (US)

(72) Inventors: Stefan Marti, Oakland, CA (US); Davide Di Censo, San Mateo, CA (US); Ajay Juneja, Mountain View, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 357 days.

(21) Appl. No.: 14/317,734

(22) Filed: Jun. 27, 2014

(65) Prior Publication Data

US 2015/0006184 A1    Jan. 1, 2015

Related U.S. Application Data

(60) Provisional application No. 61/841,242, filed on Jun. 28, 2013.

(51) Int. Cl.
  *G10L 21/00*   (2013.01)
  *G10L 15/00*   (2013.01)
  (Continued)

(52) U.S. Cl.
  CPC .............. *G10L 25/63* (2013.01); *G10L 15/22* (2013.01); *G10L 15/28* (2013.01); *G10L 2015/223* (2013.01)

(58) Field of Classification Search
  CPC ......... G10L 15/22; G10L 15/26; G10L 15/30; G10L 2015/228; G10L 15/144;
  (Continued)

(56) References Cited

U.S. PATENT DOCUMENTS

| | | |
|---|---|---|
| 6,584,439 B1 | 6/2003 | Geilhufe et al. |
| 6,747,566 B2 | 6/2004 | Hou |

(Continued)

FOREIGN PATENT DOCUMENTS

| | | |
|---|---|---|
| EP | 1333426 A1 | 8/2003 |
| EP | 2498250 A1 | 9/2012 |

OTHER PUBLICATIONS

International Search Report and Written Opinion for Application No. PCT/US2014/044521, dated Nov. 4, 2014.

(Continued)

*Primary Examiner* — Dwayne D Bost
*Assistant Examiner* — Stephen M Brinich
(74) *Attorney, Agent, or Firm* — Artegis Law Group, LLP

(57) ABSTRACT

A universal device controller is configured to operate as a proxy mechanism for interacting with a plurality of different devices wirelessly coupled to the universal device controller. When a user of the universal device controller verbally expresses a command from a universal command language understood by the device, the universal device controller analyzes the verbal expression of the user and identifies a wireless device capable of executing the associated command. The universal device controller then identifies an API for interacting with the identified device and translates the verbal expression into a device command that the identified device is capable of executing. The universal device controller then issues the device command to the identified device.

16 Claims, 23 Drawing Sheets

(51) Int. Cl.
*G10L 25/63* (2013.01)
*G10L 15/28* (2013.01)
*G10L 15/22* (2006.01)

(58) Field of Classification Search
CPC ............... G10L 15/187; G10L 15/32; G10L 2015/0631; G10L 15/20; H04M 1/271; H04M 1/6066; H04M 2250/74; B60R 16/0373; B60R 2325/101
USPC ................................. 704/270–278, 230–233
See application file for complete search history.

(56) References Cited

U.S. PATENT DOCUMENTS

| | | | |
|---|---|---|---|
| 8,340,975 B1 | 12/2012 | Rosenberger | |
| 2002/0022927 A1* | 2/2002 | Lemelson | G01S 19/11 701/301 |
| 2002/0072897 A1* | 6/2002 | Skonberg | B07C 7/005 704/201 |
| 2003/0065427 A1* | 4/2003 | Funk | G01C 21/3608 701/1 |
| 2003/0122652 A1 | 7/2003 | Himmelstein | |
| 2004/0066710 A1* | 4/2004 | Yuen | G04G 21/06 368/73 |
| 2005/0035855 A1 | 2/2005 | Sarnowsky | |
| 2007/0005370 A1 | 1/2007 | Elshout | |

OTHER PUBLICATIONS

Extended European Search Report for Application No. 14817540.9 dated Feb. 17, 2017.

* cited by examiner

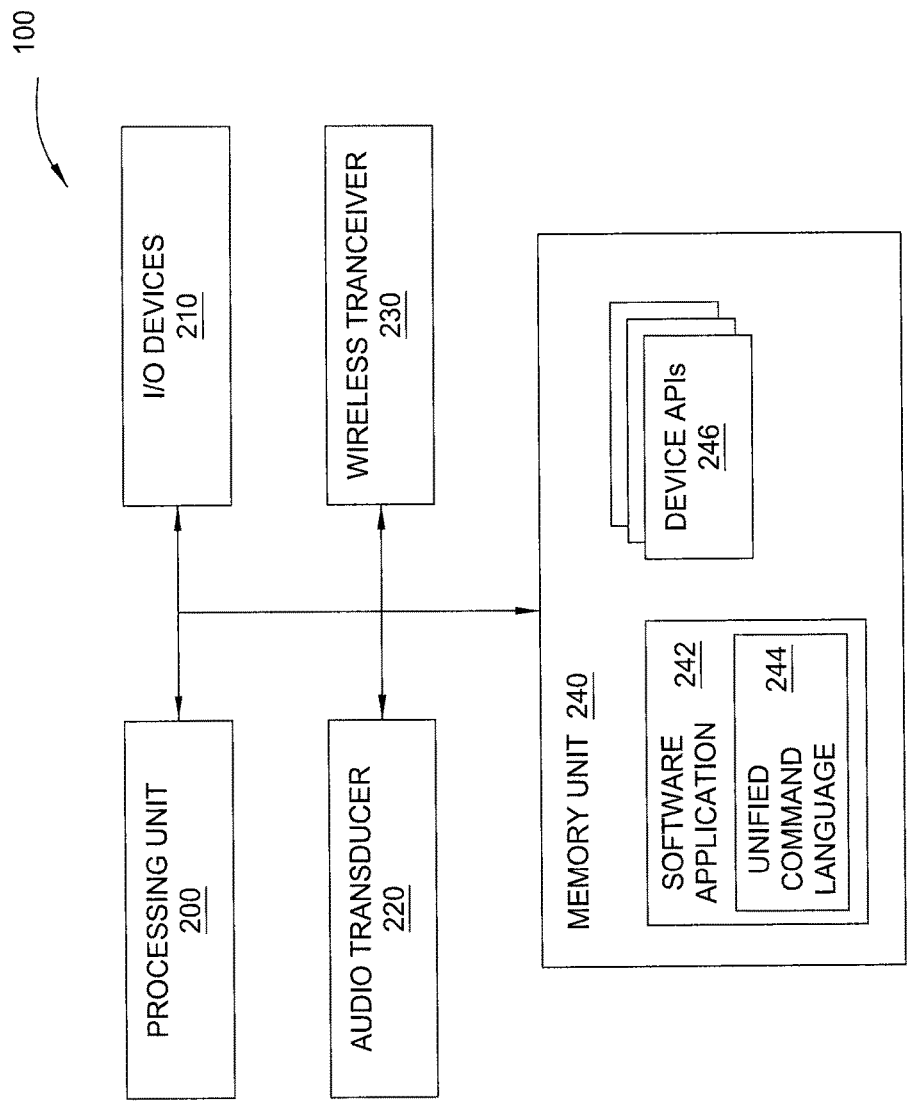

WIRELESS CONTROL OF LINKED DEVICES

CROSS-REFERENCE TO RELATED APPLICATIONS

This application claims the benefit of the United States provisional patent application titled "System and Method for Wireless Control of Linked Devices," filed on Jun. 28, 2013 and having Ser. No. 61/841,242.

BACKGROUND

Field of the Embodiments of the Invention

Embodiments of the present invention relate generally to human-device interfaces and, more specifically, to wireless control of linked devices.

Description of the Related Art

A modern computing device may expose a wide range of different types of interfaces to a user. For example, a conventional laptop computer typically includes a keyboard and mouse for interacting with an operating system (OS) and/or various software applications that execute on the laptop. Similarly, a conventional smartphone oftentimes includes a touchscreen for interacting with an OS and various applications that execute on the smartphone. Regardless of the type of interface implemented by a device, a user of the device must learn how to interact with the device interface in order to operate that device. Given the plethora of devices with which a typical person interacts on a daily basis, a significant amount of learning is normally required.

To simplify the required learning, many devices implement voice control functionality in an attempt to provide a more intuitive and natural interface for device control. With voice control functionality, a user of a given device verbalizes a command in order to cause the device to perform an associated operation. Although the voice control approach may simplify the operation of a single device, that approach may actually complicate device usage when implemented across many different devices.

Specifically, different types of devices that implement voice control oftentimes expose different command languages for interacting with those devices. Consequently, a user who interacts with a number of different voice-enabled devices is required to remember an equivalent number of different sets of commands. Complicating usability further, identical operations across two or more devices may be associated with slightly different spoken commands. For example, a first device may prepare an email when the user says "compose email," while a second device may prepare an email when the user says "write email." These subtle distinctions may confuse the user and reduce the usefulness of voice control functionality.

As the foregoing illustrates, voice control functionality is meant to simplify the operation of devices. However, since different devices implement voice control differently, i.e. via different sets of spoken commands, voice control may actually reduce the usability of devices. In situations where a user interacts with many different devices, the user may not remember all of the unique sets of commands required to interact with all of those different devices. As such, usability of those devices may be limited.

SUMMARY

One or more embodiments set forth include a non-transitory computer-readable medium storing program instructions that, when executed by a processing unit, cause the processing unit to translate verbal expressions into commands for one or more devices, by performing the steps of processing a first verbal expression to identify a first device that is capable of initiating a first operation associated with the first verbal expression, translating the first verbal expression to generate a first command that corresponds to the first operation, where the first command is included in a first set of commands associated with the first device, and transmitting the first command across a wireless connection to the first device to cause the first device to initiate the first operation.

At least one advantage of the approach described herein is that the user need only remember commands from a universal command language in order to interact with any number of different devices. Accordingly, the user is not required to remember a different command language for each different voice-enabled device.

BRIEF DESCRIPTION OF THE SEVERAL VIEWS OF THE DRAWINGS

So that the manner in which the recited features of the one more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the invention subsumes other embodiments as well.

FIG. 2A illustrates the universal device controller of FIG. 1 in greater detail, according to various embodiments;

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

System Overview

Figure 1:
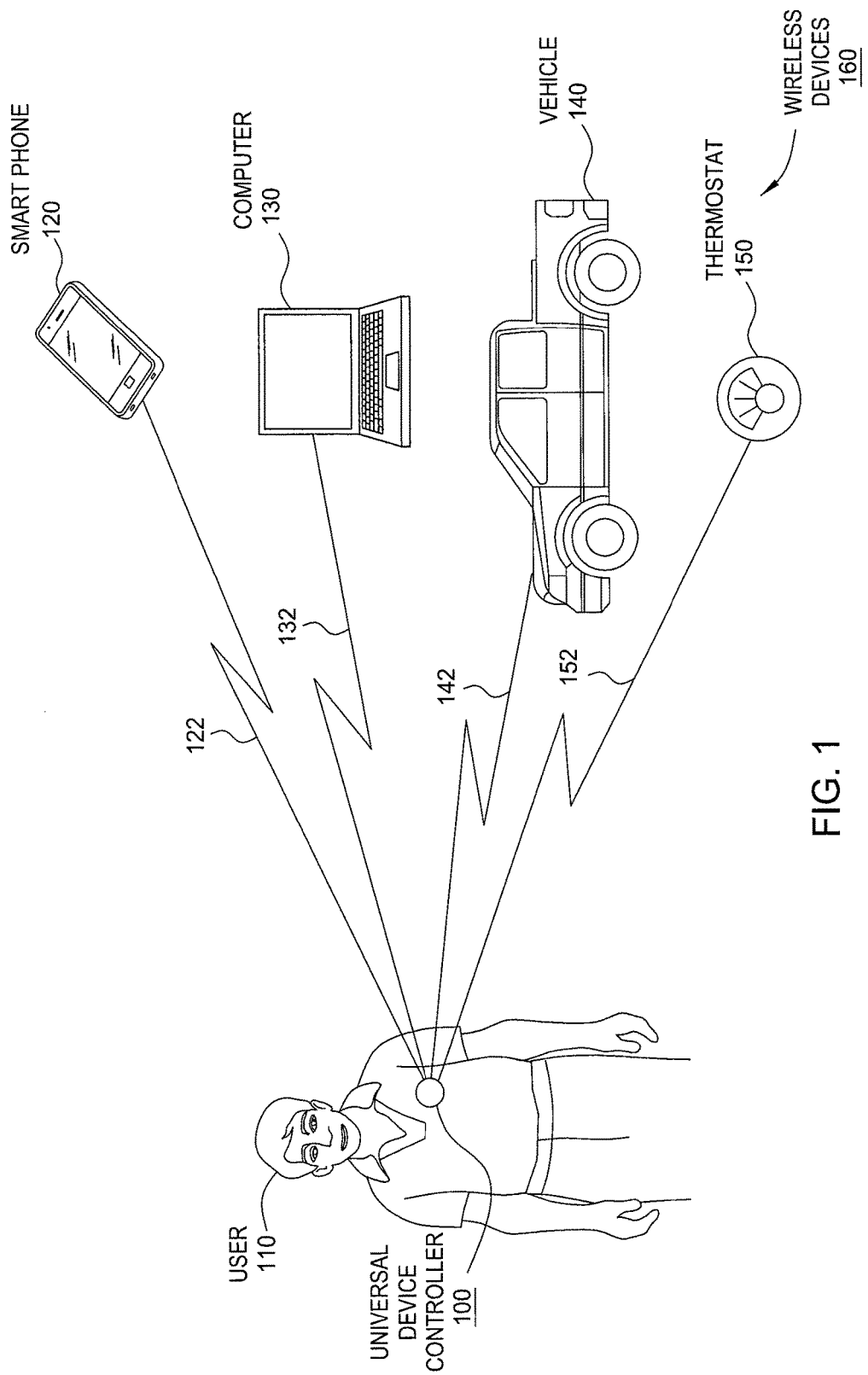
FIG. 1 illustrates a universal device controller configured to control one or more linked devices, according to various embodiments.

FIG. 1 illustrates a universal device controller 100 configured to control one or more linked devices, according to various embodiments. As shown, universal device controller 100 may be a wearable device that may be worn or carried by user 110. In alternative embodiments, the functionality of universal device controller 100 may be incorporated into a Bluetooth headset or other similar headset. Universal device controller 100 is coupled to a smartphone 120 via a wireless link 122, coupled to a computer 130 via wireless link 132, coupled to a vehicle 140 via wireless link 142, and coupled to a thermostat 150 via wireless link 152. The aforementioned devices are referred to herein collectively as wireless devices 160. In practice, universal device controller 100 may establish a communication link with a wide range of different wireless devices beyond smartphone 120, computer 130, vehicle 140, and thermostat 150. The specific wireless devices 160 illustrated in FIG. 1 are shown for exemplary purposes only and not meant to be limiting. Each of wireless links 122, 132, 142, and 152 may be any technically feasible wireless communication link, including, without limitation, a WiFi™ link, a Bluetooth connection, or a generic radio frequency (RF) connection.

In operation, universal device controller 100 acts as a proxy mechanism for controlling the various wireless devices 160 coupled thereto. User 110 may instruct any of those wireless devices 160 to perform specific operations by expressing verbal commands to universal device controller 100. For example, and without limitation, user 100 could verbalize the command "shut down laptop" in order to cause universal device control 100 to issue a power-down command to laptop 130. In another example, user 100 could verbalize the command "set heat to 75 degrees" in order to cause universal device controller 100 to issue a climate change command to thermostat 150, without limitation. FIGS. 3A-6 discuss in greater detail various exemplary use-case scenarios in which user 110 may interact with universal device controller 100 for the purpose of controlling one or more of wireless devices 160. Conceptually, universal device controller 100 operates as an intermediary between user 110 and those different wireless devices 160.

Universal device controller 100 is configured to implement a "unified command language" that includes a set of commands that are recognizable by universal device controller 100. The unified command language is described in greater detail herein and also below in conjunction with FIGS. 2A-2B. A command in the unified command language may correspond to an operation that only one specific device may perform. For example, and without limitation, the command "start engine" in the unified command language would correspond only to the operation of starting the engine of vehicle 140. Alternatively, a command in the unified command language may correspond to similar operations that more than one wireless device 160 is capable of performing. For example, and without limitation, the command "compose email" in the unified command language could correspond to composing an email using either smartphone 120 or computer 130. Universal device controller 100 is configured to disambiguate between multiple devices capable of performing the same operation using different techniques that are described in greater detail below in conjunction with FIGS. 4A-4D.

When user 110 verbalizes a command in the unified command language, universal device controller 100 receives that command and maps the command into the unified command language, and then identifies a specific device, of the various wireless devices 160 coupled thereto, capable of performing an operation corresponding to the command. Universal device controller 100 then obtains an application programming interface (API) associated with the identified device and, using that API, translates the command from the unified command language into a device-specific command that can be executed by the identified device. Universal device controller 100 then issues that device-specific command to the identified device to cause that device to perform the associated operation.

In one embodiment, universal device controller 100 is responsive to a wide variety of verbalizations from user 110 beyond explicit commands. For example, and without limitation, user 110 could simply express a state of being, such as "I'm cold," and universal device controller 100 would then take action to improve that state of being, such as increasing the temperature by interacting with thermostat 150. In another example, without limitation, universal device controller 100 could analyze properties of the voice of user 110, such as the tone of voice or speed of speech, and then rate the mood of the user based on those properties. Then, universal device controller 110 could cause a wireless multimedia device (not shown) to play music associated with, or compensating for, that mood. As a general matter, universal device controller 100 may act to improve the day-to-day experience of user 110 by initiating specific actions in response to a detected or estimated state of being of user 110. In doing so, universal device controller may identify a device to take a specific action that is capable of influencing the identified state of being of user 110.

In this fashion, user 110 need only speak a command or express a state of being to universal device controller 100 in order to cause any of wireless devices 160 to perform an operation. This approach may simplify usage of those wireless devices 160 and improve the user experience of interacting with those devices. Universal device controller 100 may be implemented in any technically feasible combination of hardware and software, although one exemplary implementation is described in greater detail below in conjunction with FIG. 2A.

FIG. 2A illustrates universal device controller 100 in greater detail, according to various embodiments. As shown, universal device controller 100 includes a processing unit 200, input/output (I/O) devices 210, an audio transducer 220, a wireless transceiver 230, and a memory unit 240, coupled together. Memory unit 240 includes a software application 242 that includes unified command language 244, mentioned above. Memory unit 240 also includes a set of device application programming interfaces (APIs) 246.

Processing unit 200 may be any technically feasible unit configured to process data and execute software applications, including, for example, a central processing unit (CPU) or an application-specific integrated circuit (ASIC), without limitation. I/O devices 210 include devices configured to receive input (such as, e.g., a set of buttons, without limitation) devices configured to deliver output (such as, e.g., a display screen, without limitation), as well as devices capable of both receiving input and delivering output (such as, e.g., a universal serial bus (USB) port, without limitation).

Audio transducer 220 may be any technically feasible type of device configured to receive and transduce audio signals. Audio transducer 220 is configured to detect verbalizations from user 110 and transduce those verbalizations to processing unit 200 for processing, as described in greater detail below. The verbalizations could be, for example, spoken commands or general sentiments expressed by user, among other types of utterances, without limitation. Wireless transceiver 230 may be any technically feasible device configured to establish wireless communication links with wireless devices 160, including, without limitation, a WiFi™ transceiver, a Bluetooth transceiver, an RF transceiver, and so forth. Wireless transceiver is configured to establish wireless links 122, 132, 142, and 152 shown in FIG. 1.

Memory unit 240 may be any technically feasible unit configured to store data and program code, including, for example, a random access memory (RAM) module or a hard disk, without limitation. Software application 242 within memory unit 240 may be executed by processing unit 200 in order to process verbalizations from user 110, as mentioned above. In doing so, software application 242 may implement a wide variety of different speech recognition algorithms to analyze and parse frequency and amplitude data associated with those verbalizations. Software application 242 is configured to then map verbalizations into unified command language 244.

As mentioned above in conjunction with FIG. 1, unified command language 244 specifies a set of spoken commands that user 100 may verbalize in order to cause one or more of devices 160 to perform a corresponding action. When a software application 242 processes a spoken command, software application 242 is configured to identify a specific command within unified command language 244 corresponding to that spoken command. Again, a given command in unified command language 244 need not be associated with just one of devices 160; application 242 is configured to identify the most relevant device to perform an operation associated with each command using various techniques described in greater detail below in conjunction with FIGS. 4A-4D.

Once software application 244 identifies a specific device to perform the operation associated with the spoken command, software application 242 then retrieves, from APIs 246, an API associated with the identified device. An API associated with a given device includes, among other things, a set of device-specific commands that the given device is capable of executing. Based on the API associated with the identified device, software application 242 translates the command from the unified command language to a device-specific command, and then causes wireless transceiver 230 to issue the device-specific command to the identified device. The command processing and translation approach discussed above is described in greater detail below in conjunction with FIG. 2B.

Figure 2B:
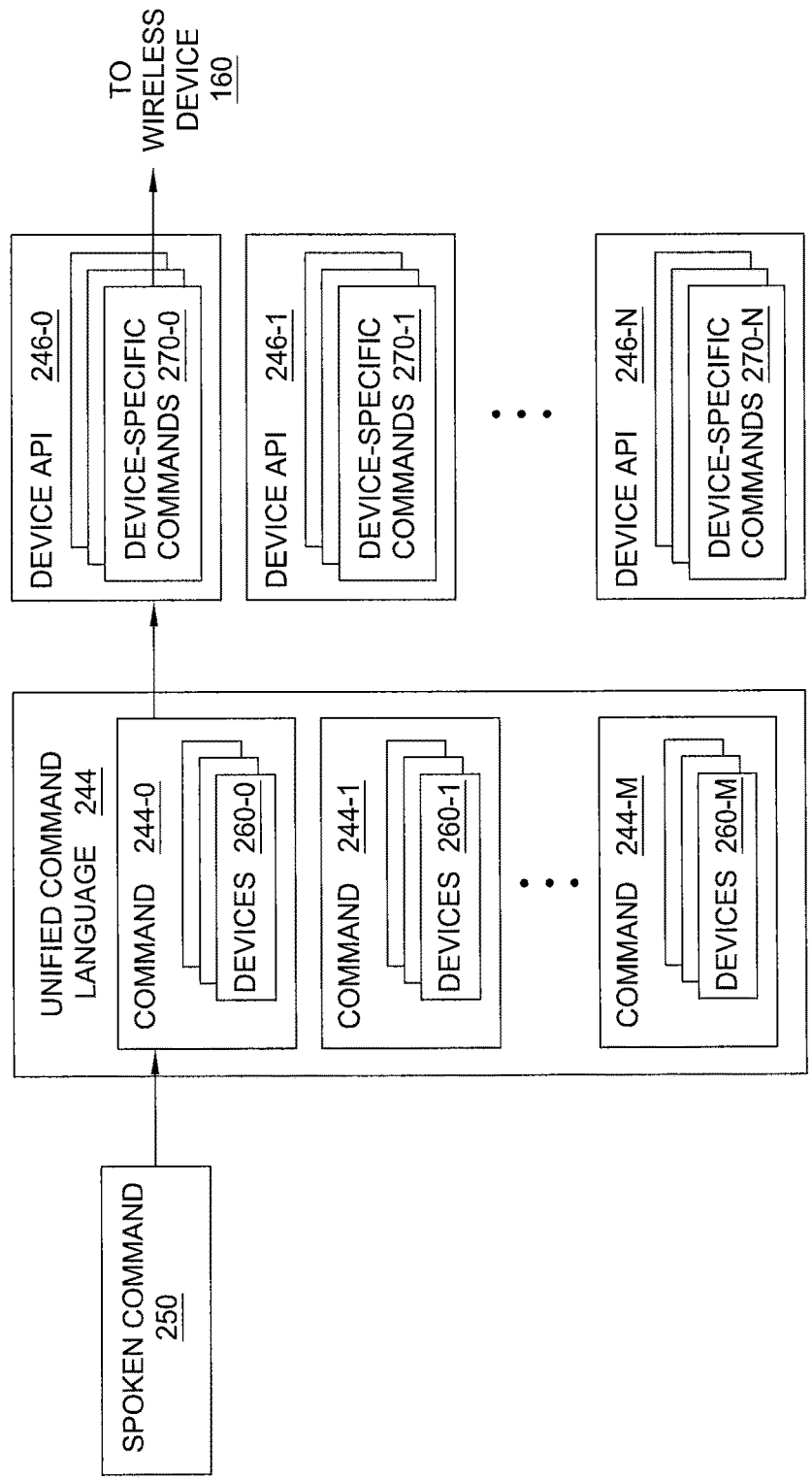
FIG. 2B illustrates an exemplary mapping of a spoken command to a command that is specific to a linked device shown in FIG. 1, according to various embodiments.

FIG. 2B illustrates an exemplary mapping of a spoken command to a command that is specific to a linked device shown in FIG. 1, according to various embodiments. Universal device controller 100 is configured to perform the mapping process illustrated in FIG. 2B, and, in doing so, may process or rely upon any of the data shown in that Figure. As shown, universal device controller 100 is configured to map a spoken command 250 to a command 244-0 in unified command language 244. Unified command language 244 includes commands 244-0 through 244-M, which, again, reflects the set of spoken commands recognizable by universal device controller 100. Each of commands 244-0 through 244-M specifies devices 260 capable of performing an operation associated with the respective command, where devices 260 include a subset of wireless devices 160 shown in FIG. 1.

Specifically, command 244-0 specifies that devices 260-0 are capable of performing an operation associated with command 244-0, command 244-1 specifies that devices 260-1 are capable of performing an operation associated with command 244-1, and command 244-M specifies that devices 260-M are capable of performing an operation associated with command 244-M. For example, and without limitation, a command 244 could be associated with a "start engine" operation, and, thus, devices 260 within that command would specify vehicle 140. In another example, without limitation, a command 244 could be associated with a "compose email" operation, and, thus, devices 260 within that command would specify smartphone 120 and computer 130.

Once universal device controller 100 has mapped spoken command 250 to command 244-0, universal device controller 100 retrieves devices 260-0 specified within command 244-0 and then identifies a particular device, from within devices 260-0, to perform the relevant operation. Universal device controller 100 could identify the particular device based on spoken command 250, or perform the disambiguation process mentioned above and discussed below in conjunction with FIGS. 4A-4D. Once a specific wireless device 160 has been identified from within devices 260-0, universal device controller 100 then retrieves device API 246-0 that corresponds to that device.

Universal device controller 100 generally includes a number of device APIs 246 equal to the number of wireless devices 160 configured to be coupled thereto. However, in some situations, universal device controller 100 may lack a specific device API for a particular wireless device. In those situations, universal device controller 100 is configured to obtain the relevant device API, e.g., by downloading the relevant device API from the Internet, among other possibilities, without limitation. Each device API 246 includes a set of device-specific commands 270 that reflect commands capable of being executed by the associated wireless device. Specifically, device API 246-0 includes device-specific commands 270-0 that can be executed by the wireless device associated with device API 246-0, device API 246-1 includes device-specific commands 270-1 that can be executed by the wireless device associated with device API 246-1, and device API 246-N includes device-specific commands 270-N that can be executed by the wireless device associated with device API 246-N.

Upon retrieving device API 246-0, universal device controller 100 then parses device-specific commands 270-0 to identify a particular device-specific command that corresponds to command 244-0. Universal device controller 100 then transmits the identified device-specific command to the associated wireless device. In some situations, universal device controller 100 may also configure the device-specific command based on spoken command 250. For example, and without limitation, spoken command 250 could be "hello computer, compose email to Mark," in which case universal device controller 100 would configure a "compose email" device-specific command 270 associated with computer 130 with a recipient field configured to an address associated with "Mark." In another example, and without limitation, spoken command 250 could be "set temperature to 75 degrees," in which case universal device controller 100 would configure a "temperature setting" device-specific command 270 associated with thermostat 150 with a "temperature" field configured to "75 degrees."

In some embodiments, universal device controller 100 is responsive to verbal expressions received from user 110 beyond explicit commands, including expressions of states of being, as mentioned above in conjunction with FIG. 1. In those embodiments universal device controller 100 is configured to map verbal expressions of states of being into unified command language 244 by determining operations that may influence that state of being and then identifying a corresponding command in unified command language 244. For example, and without limitation, if the user expresses the state of being "I'm cold," reflected by spoken command 250, then universal device controller 100 could determine that a temperature change operation would influence that particular state of being. Then, universal device controller 100 may identify a command within unified command language 244 associated with temperature change. By parsing devices 260 associated with that command, universal device controller 100 would determine that vehicle 140 or thermostat 150 are both capable of performing a temperature change operation. Universal device controller 100 would then select between those two devices using any of the disambiguation techniques discussed herein, identify a device-specific command 270 for the selected device, and issue that device-specific command 270 to the selected device, thereby influencing the state of being expressed by user 110.

Persons skilled in the art will understand that the specific implementation of universal device controller 100 shown in FIG. 2A, and the exemplary mapping process shown in FIG. 2B, are provided for exemplary purposes only, and not meant to limit the scope of the present invention. In practice, universal device controller 100 may be implemented by a wide variety of different combinations of hardware and software. For example, universal device controller 100 could be implemented by an integrated circuit configured to perform the functionality described above, without limitation. In another example, universal device controller 100 could be implemented by a system-on-chip configured to perform that functionality, without limitation. As a general matter, any device configured to perform the functionality of universal device controller 100 described herein falls within the scope of the present invention. Similarly, universal device controller 100 may be configured to perform any technically feasible approach to translating a spoken command into a device-specific command, beyond the exemplary process shown in FIG. 2B.

In some embodiments, a human language spoken by user 110 and associated with unified command language 244 may differ from a language that a voice-enabled wireless device 160 relies upon. In such cases, universal device controller 100 is configured to translate spoken commands received from user 110 into either API calls that the voice enabled wireless device 160 recognizes or voice commands translated into the language that the wireless device 160 relies upon. In this fashion, universal device controller 100 may seamlessly integrate control of wireless devices configured for many different human languages under the human language associated with universal command language 244.

Exemplary Use-Cases Illustrating the Operation of Universal Device Controller

Figure 3A:
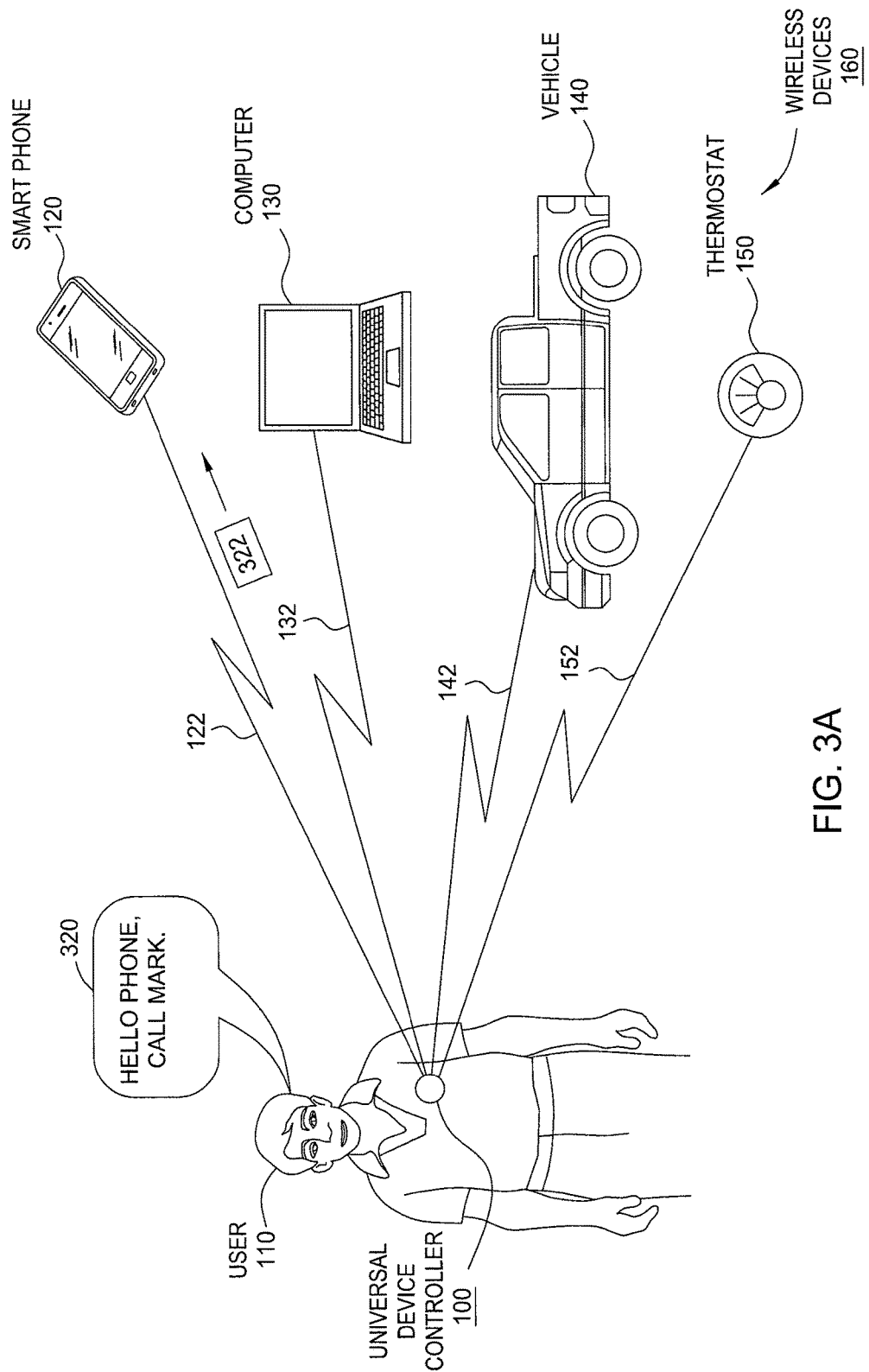
FIGS. 3A-3C illustrate exemplary use-cases where the universal device controller of FIG. 1 issues a command to a linked device on behalf of a user, according to various embodiments.
Figure 3B:
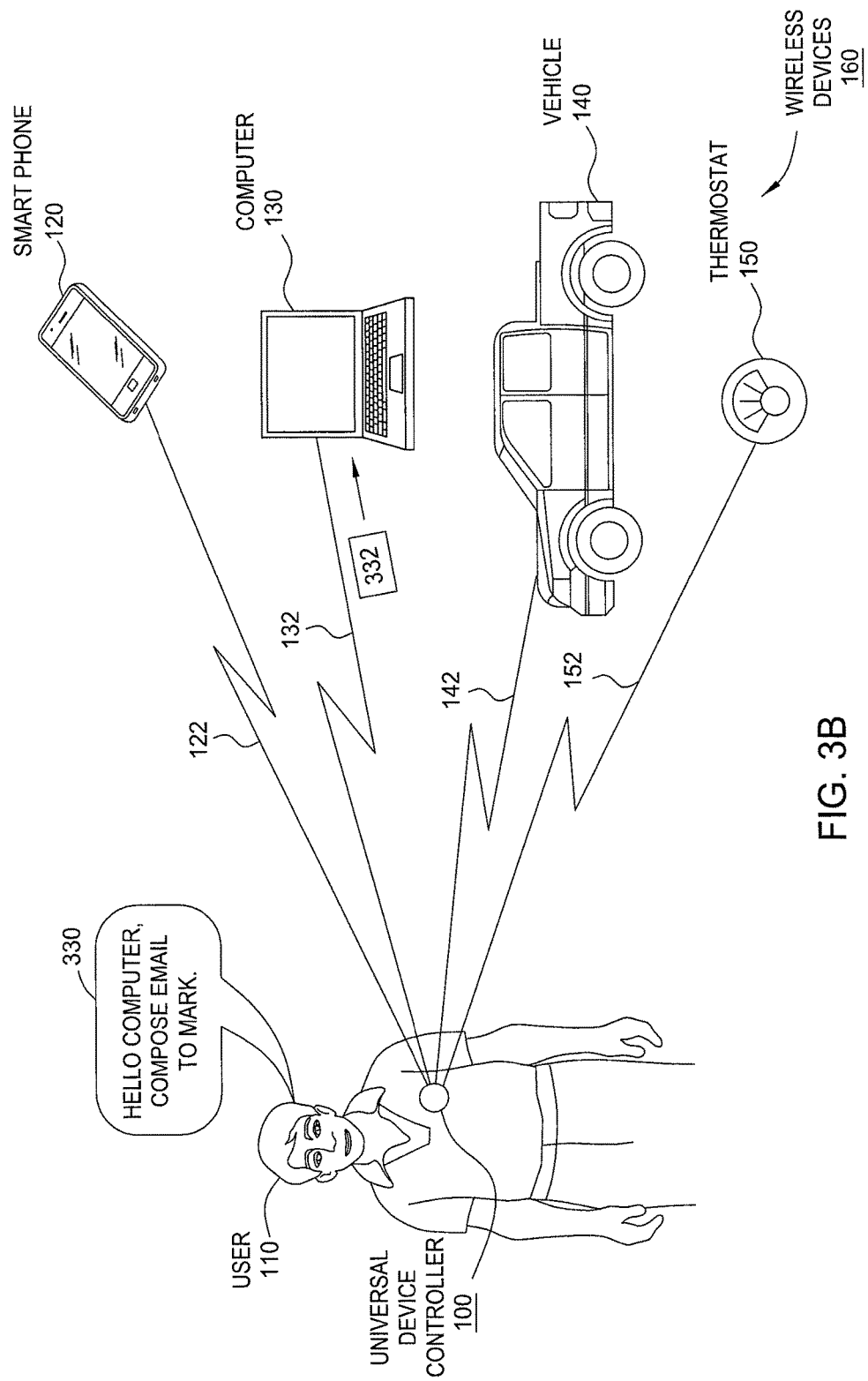
Figure 3C:
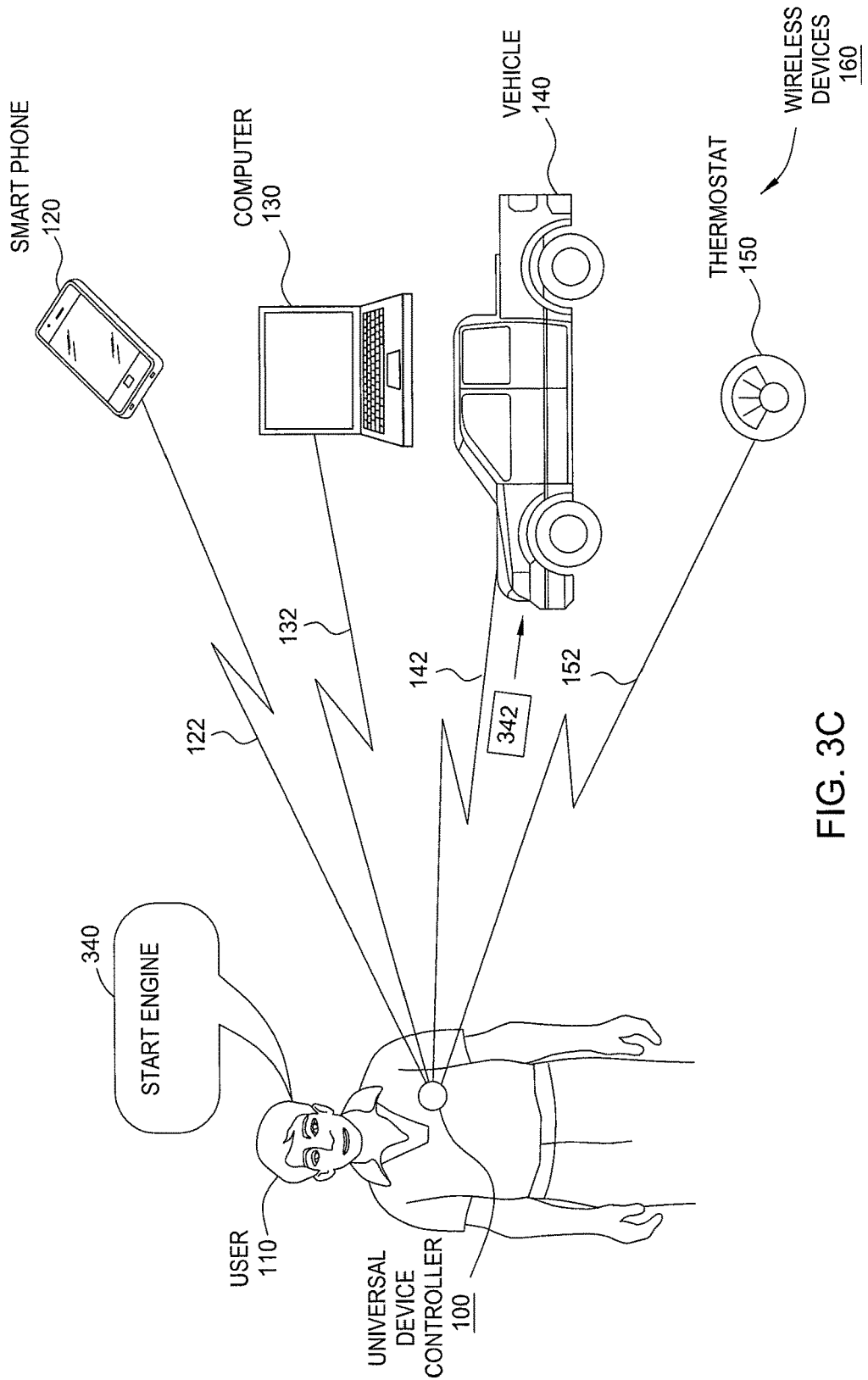

FIGS. 3A-3C illustrate exemplary use-cases where the universal device controller of FIG. 1 issues a command to a linked device on behalf of a user, according to various embodiments. As shown in FIG. 3A, user 110 speaks a command 320, "hello phone, call Mark," to universal device controller 100. Universal device controller 100 receives command 320 and performs speech processing to map command 320 into unified command language 244 shown in FIG. 2A. Universal device controller 100 then identifies a particular wireless device capable of performing an operation corresponding to the command in the unified command language. In doing so, universal device controller 100 may determine that user 110 has specifically indicated that smartphone 120 should perform the operation, since user 110 has spoken the key phrase "hello phone." Universal device controller 100 then translates the command in the unified command language into a device-specific command 322 that can be executed by smartphone 120 based on an API associated with smartphone 120. Universal device controller 100 then issues device-specific command 322 to smartphone 120 to cause smartphone 120 to call Mark.

As shown in FIG. 3B, user 110 speaks a command 330, "hello computer, compose email to Mark," to universal device controller 100. Universal device controller 100 receives command 330 and, similar to above, performs speech processing to map command 330 into unified command language 244 shown in FIGS. 2A-2B. Since user 110 has spoken the key phrase "hello computer," universal device controller 100 identifies computer 130 as being able to perform the desired operation. Universal device controller 100 may then translate the command in the unified command language into a device-specific command 332 that can be executed by computer 130 using an API associated with computer 130. Universal device controller 100 then issues device-specific command 332 to computer 130 to cause computer 130 to compose an email to Mark.

Referring generally to FIGS. 3A-3B, universal device controller 100 is configured to recognize the key phrase "hello" in addition to a name of a specific wireless device 160 (e.g., "phone," "computer," "vehicle," etc.) in order to route commands to those different devices. Persons skilled in the art will recognize that the word "hello" is immaterial, and may be changed or omitted. Generally, universal device controller 100 may receive a specific indication of a wireless device 160 capable of performing a desired operation, and then route a command to that device. Universal device controller 100 may also implement other techniques for properly routing commands, including automatically determining the most relevant device, as described below in conjunction with FIG. 3C, as well as interacting with user 110 or wireless devices 160 to determine appropriate command routing, as described in greater detail below in conjunction with FIGS. 4A-4D.

As shown in FIG. 3C, user 110 speaks a command 340, "start engine," to universal device controller 100. Universal device controller 100 receives command 340 and performs speech processing to map command 340 into unified command language 244 shown in FIGS. 2A-2B. Universal device controller 100 then identifies a particular device capable of performing an operation corresponding to the command in the unified command language. Since only vehicle 140 includes an engine, universal device controller 100 is configured to discern that command 340 indicates an operation that only vehicle 140 is capable of performing. Accordingly, universal device controller 100 translates the command in the unified command language into a device-specific command 342 that can be executed by vehicle 140 based on an API associated with vehicle 140. Universal device controller 100 then issues device-specific command 342 to vehicle 140 to cause vehicle 140 to start the engine.

Figure 4A:
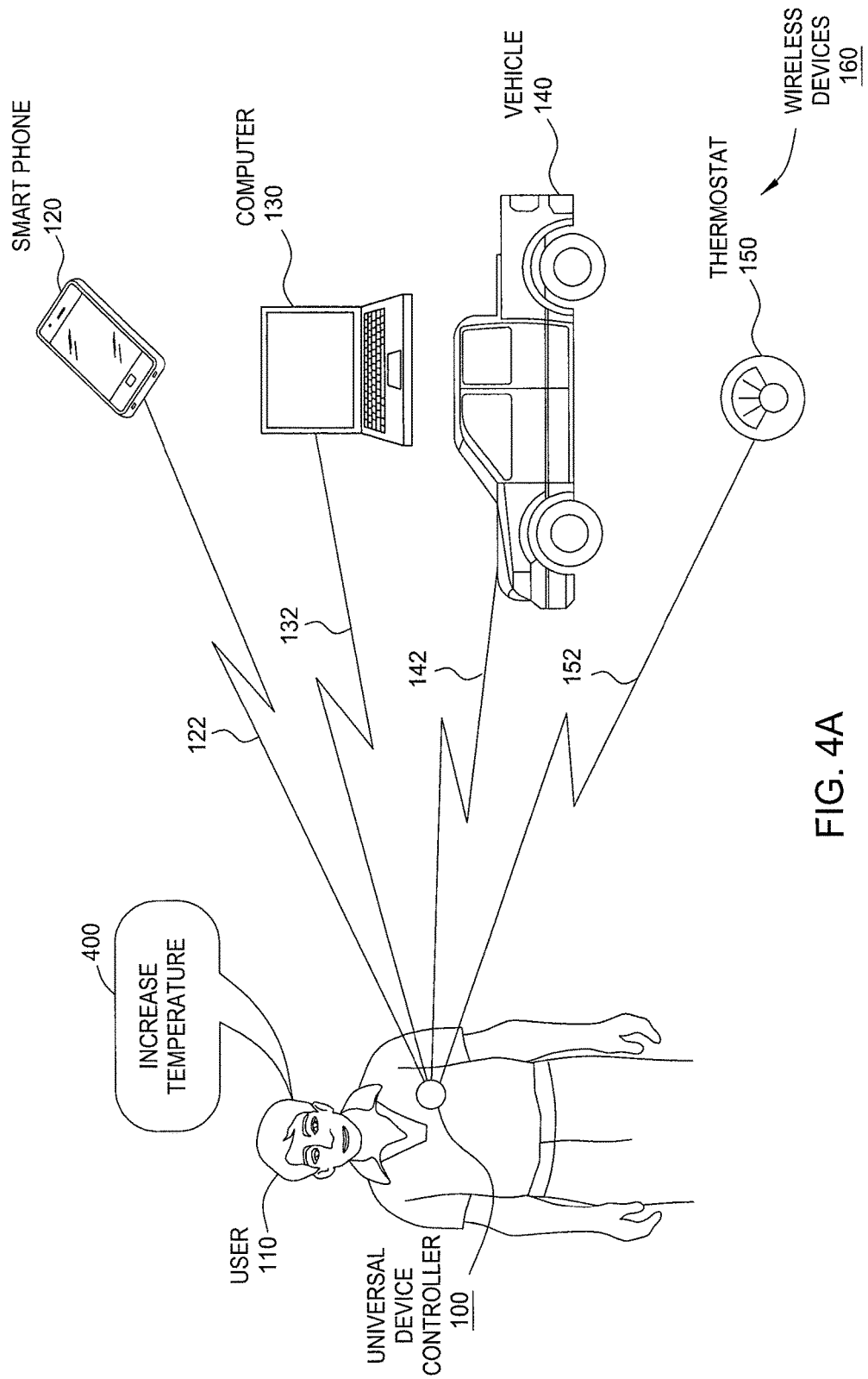
FIGS. 4A-4D illustrate an exemplary use-case where the universal device controller of FIG. 1 disambiguates between linked devices in order to route a command to the appropriate linked device, according to various embodiments.

FIGS. 4A-4D illustrate an exemplary use-case where the universal device controller of FIG. 1 disambiguates between linked devices in order to route a command to the appropriate linked device, according to various embodiments. As shown in FIG. 4A, user 110 speaks a command 400, "increase temperature," to universal device controller 100. Universal device controller 100 receives command 320 and performs speech processing to map command 320 into unified command language 244 shown in FIGS. 2A-2B. Universal device controller 100 then determines that both vehicle 140 and thermostat 150 are capable of increasing the temperature, and attempts to disambiguate between those two devices so that the appropriate device can be caused to increase the temperature.

Figure 4B:
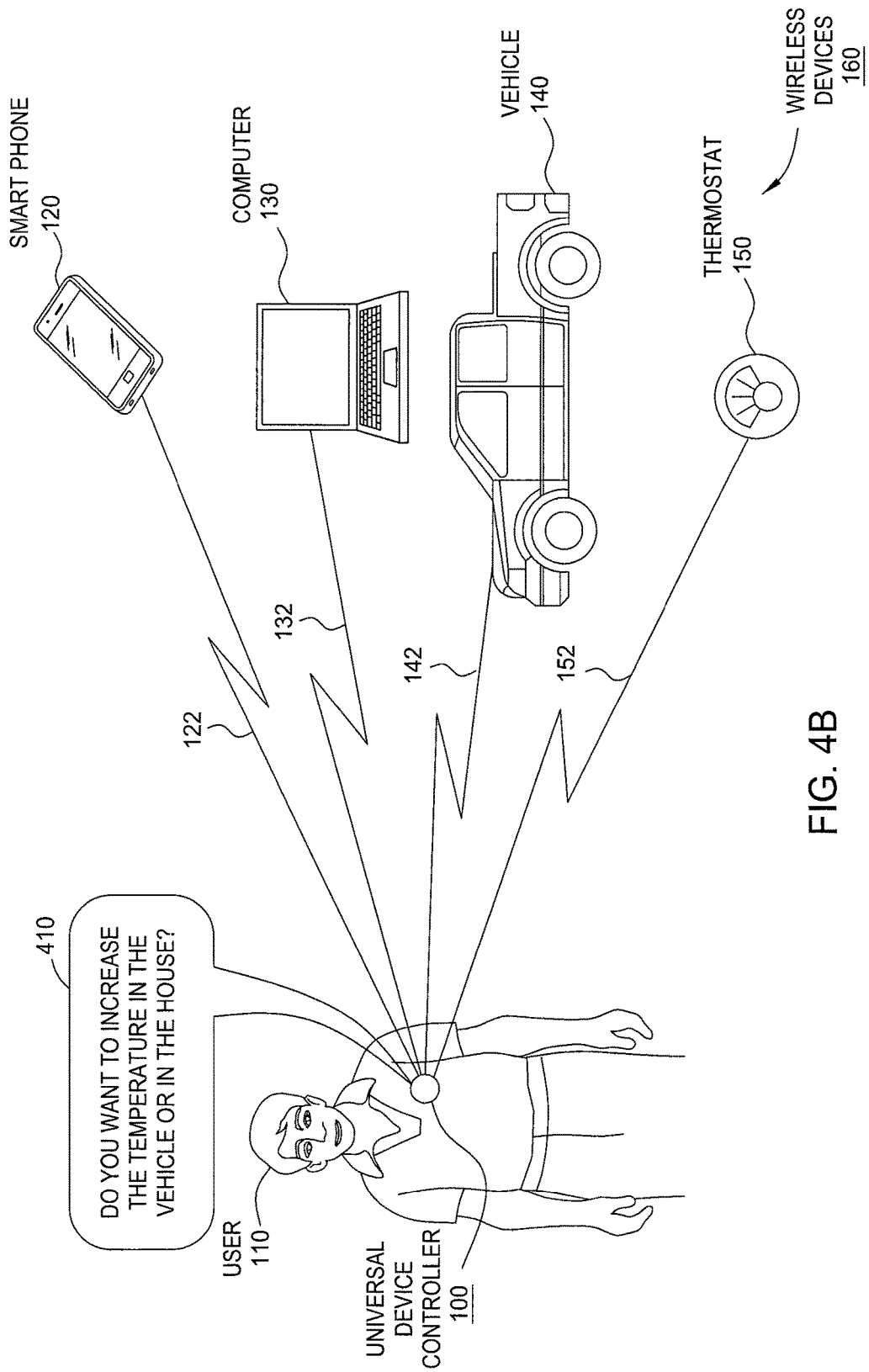

Specifically, as shown in FIG. 4B, universal device controller 100 generates message 410 that queries user 110 which of the two possible devices should increase the temperature. Specifically, message 410 queries: "do you want to increase the temperature in the vehicle or in the house?"

Figure 4C:
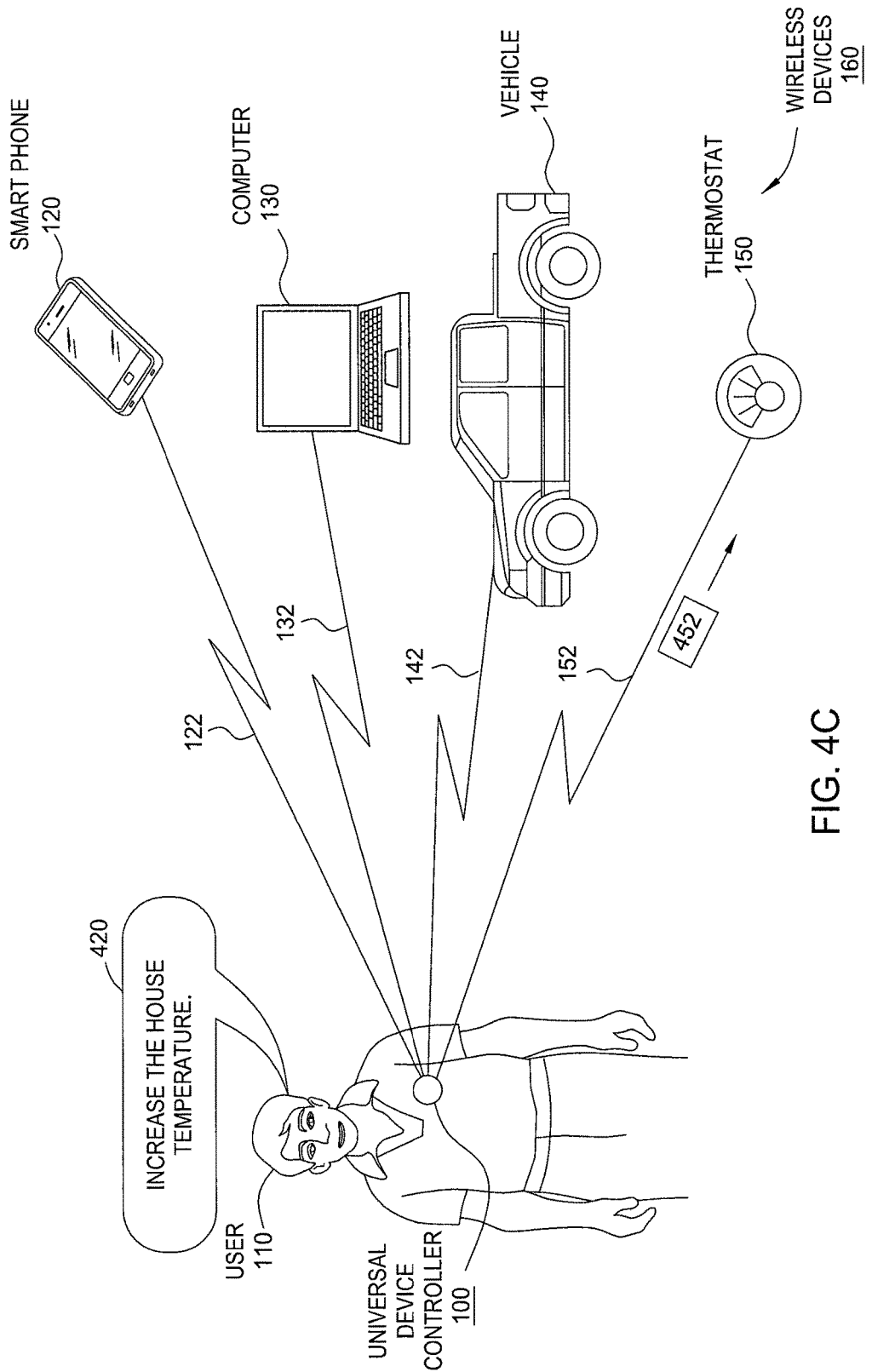

As shown in FIG. 4C, user 110 responds with response 420, "increase the house temperature." Universal device controller 100 processes response 420 and determines that thermostat 150 should perform an action corresponding to command 400. Universal device controller 100 then translates the command in the unified command language into a device-specific command 352 that can be executed by thermostat 150 based on an API associated with thermostat 150. Universal device controller 100 then issues device-specific command 452 to thermostat 150 to cause thermostat 150 to increase the temperature in the house. User 110 may also indicate to universal device controller 100 that both of the two possible devices should increase temperature. Generally, user 110 may specify that any wireless device 160 or collection of wireless devices capable of performing a given operation should perform that operation, including all such capable devices. Universal device controller 100 may also automatically disambiguate between wireless devices 160 for the purpose of command routing, as described below in conjunction with FIG. 4D.

Figure 4D:
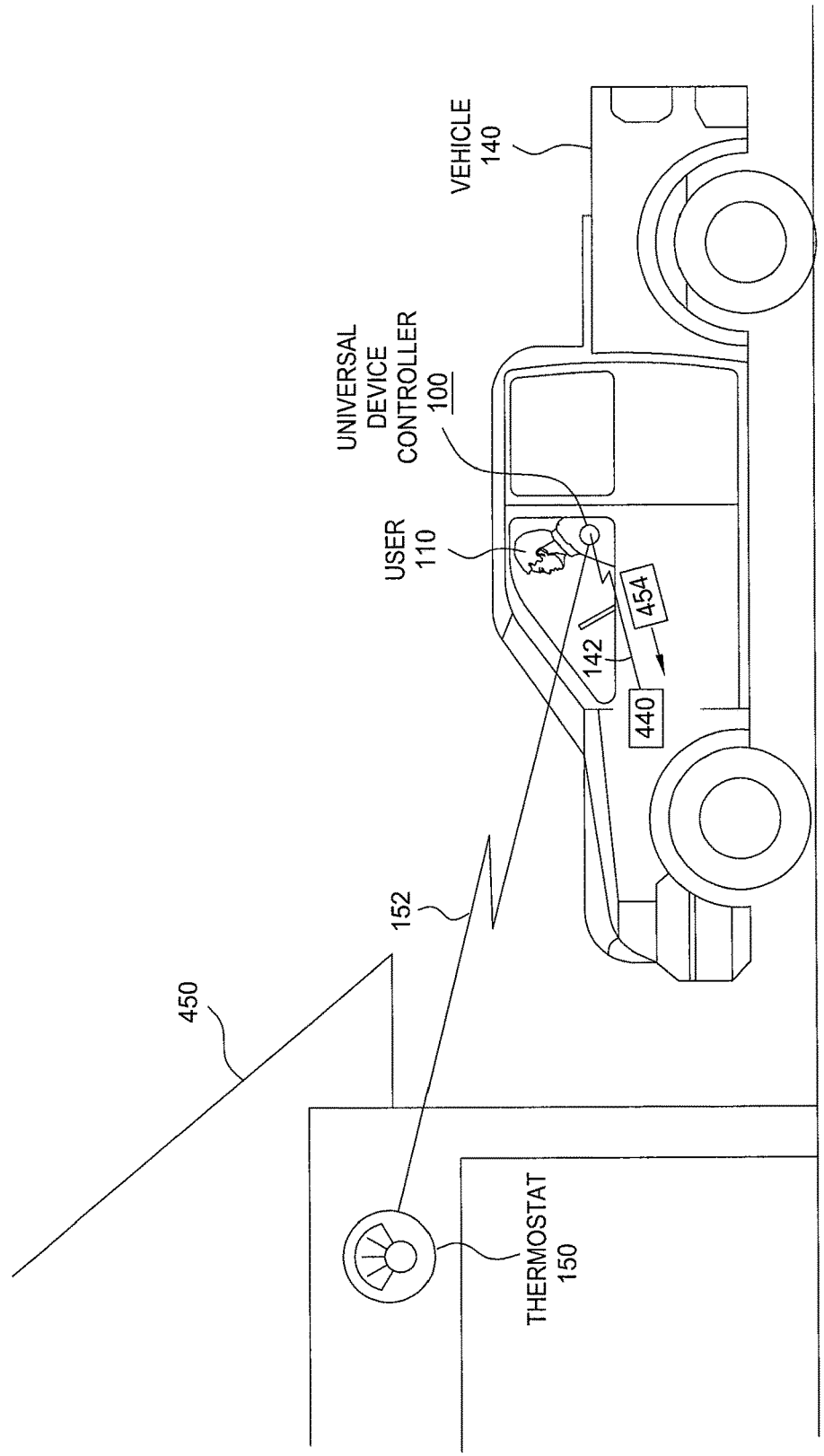

As shown in FIG. 4D, user 110 occupies vehicle 140, which includes a wireless transceiver 440. When user 110 speaks command 400 shown in FIG. 4A, universal device controller 100 determines that user 110 is closer to vehicle 140 than to thermostat 150, which resides within house 450. Universal device controller 100 therefore determines that command 400 corresponds to a climate change operation that should be performed by vehicle 140. Universal device controller 100 then translates the command in the unified command language into a device-specific command 454 that can be executed by vehicle 140 based on an API associated with vehicle 140. Universal device controller 100 then issues device-specific command 454 to wireless transceiver 440 within vehicle 140 to cause vehicle 140 to increase the temperature in the cabin of that vehicle.

Referring generally to FIGS. 4A-4D, persons skilled in the art will understand that the techniques implemented by universal device controller 100 for disambiguating between multiple devices capable of performing a desired operation are presented for exemplary purposes only. Universal device controller 100 may implement other techniques in addition to those discussed in conjunction with these Figures. For example, and without limitation, universal device controller 100 may select between two devices capable of performing a desired operation based on how recently each device was used or device usage frequency. Universal device controller 100 may also disambiguate between devices based on user preferences configured by user 110. For example, and without limitation, user 110 could configure universal device controller 100 to preferentially compose emails via computer 130 over smartphone 120, whenever possible. Other routing criteria could include, without limitation, a cost value of performing an operation with one device versus another (e.g., cost of sending an email via WiFi™ versus cell network, without limitation), or performance of one device versus another (e.g., bandwidth needed to send an email via smartphone 120 versus computer 130, without limitation).

Additionally, universal device controller 100 may select between similar operations performed by one or more devices based on various criteria. For example, universal device controller 100 could select between sending a message to a recipient via email or via text message based on cost, performance, estimated time before the recipient reads the message etc., without limitation. Universal device controller 100 may also perform command routing operations according to user preferences when different wireless devices 160 are wirelessly coupled to one another in a master-slave type configuration, as described in greater detail below in conjunction with FIGS. 5A-5C.

Figure 5A:
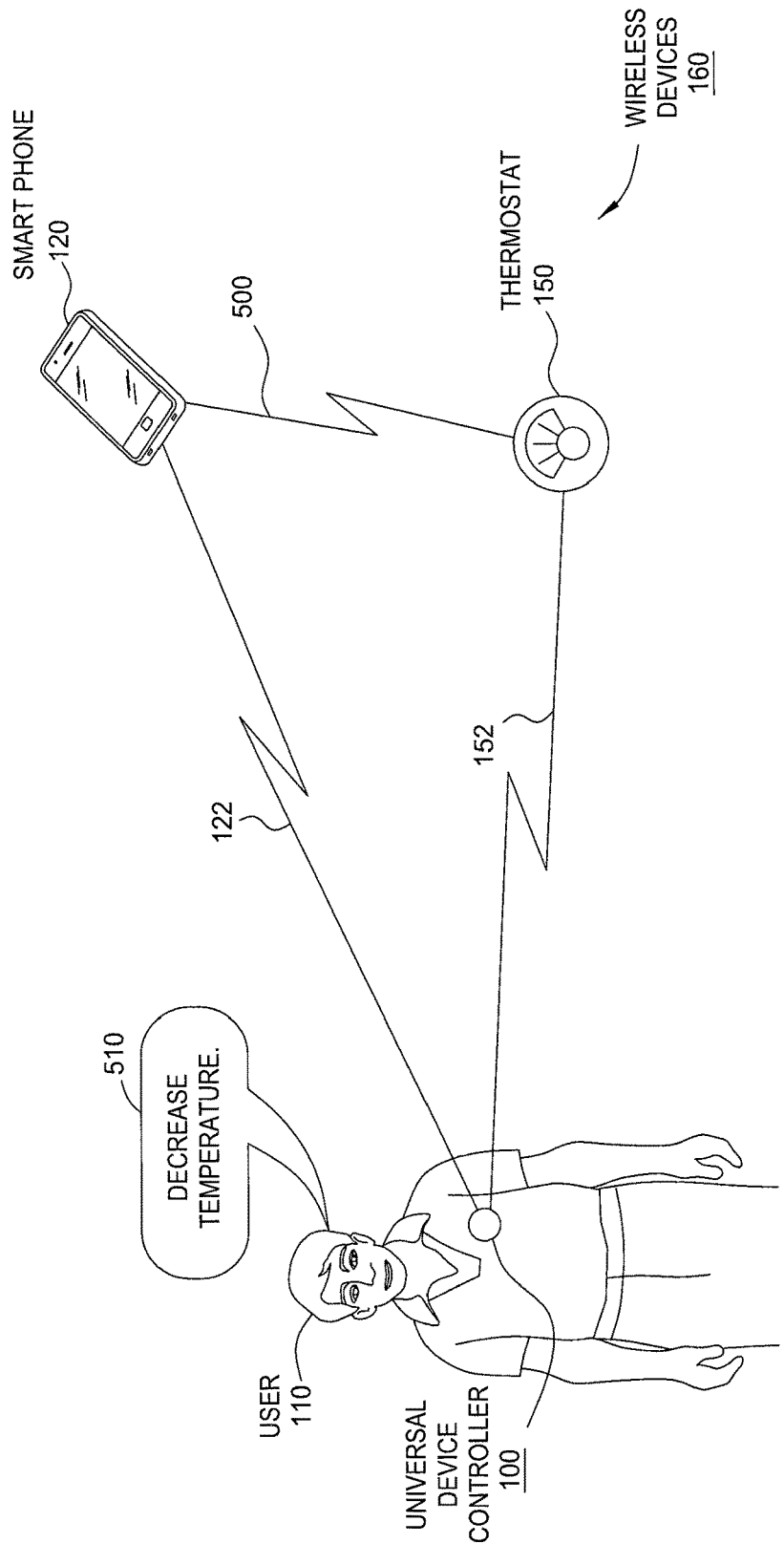
FIGS. 5A-5C illustrates an exemplary use case where the universal device controller of FIG. 1 routes a command to a linked device based on user preferences, according to various embodiments.
Figure 5B:
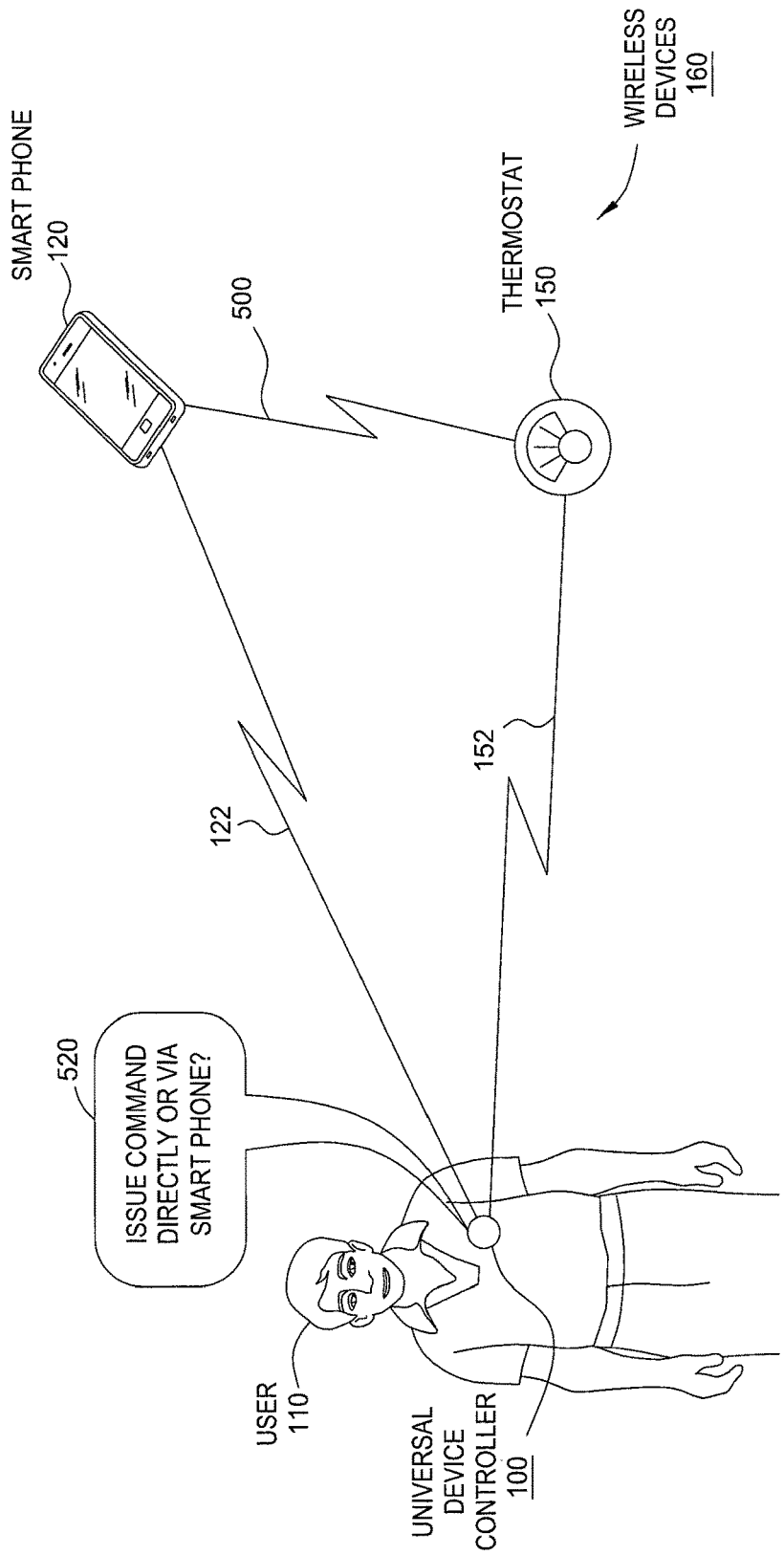
Figure 5C:
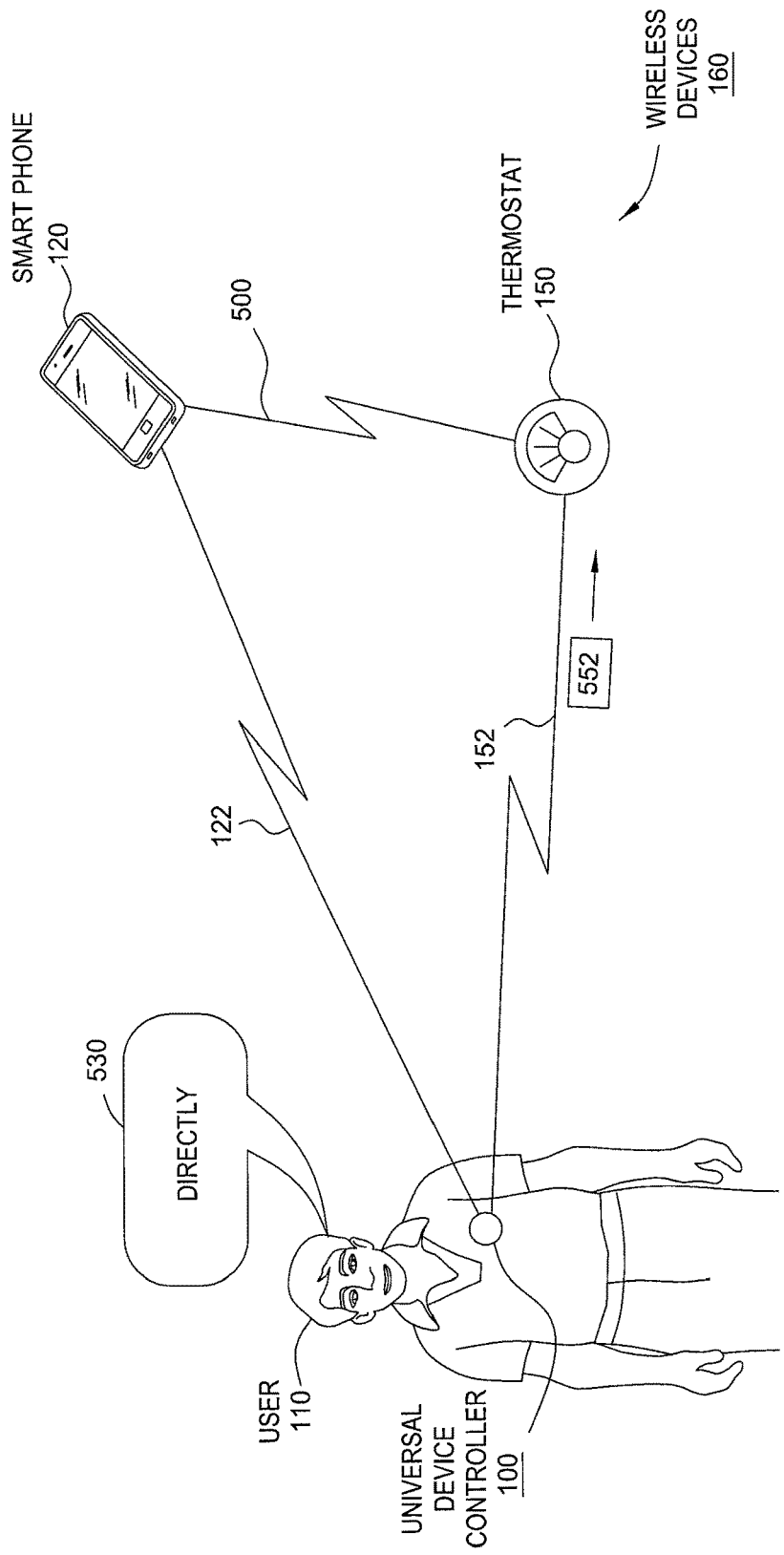

FIGS. 5A-5C illustrates an exemplary use case where the universal device controller of FIG. 1 routes a command to a linked device based on user preferences, according to various embodiments. As shown in FIG. 5A, universal device controller 100 is coupled to smartphone 120 and to thermostat 150 via wireless links 122 and 152, as also shown in FIG. 1. In addition, smartphone 120 is coupled to thermostat 150 via communication link 500. In this configuration, smartphone 120 may execute an application for managing thermostat 150 remotely, allowing user 110 to change climate settings by interacting with the thermostat management application instead of physically adjusting thermostat 150 itself. Persons skilled in the art will recognize that smartphone 120 acts as a master device while thermostat 150 acts as a slave device in the configuration shown in FIG. 5A.

When universal device controller 100 is coupled to both smartphone 120 and thermostat 150 in this fashion, user 110 may cause either device to initiate a climate change by verbalizing a command in the unified command language. For example, and without limitation, universal device controller 100 could map the command to a device-specific command associated with smartphone 120 in the fashion discussed previously, and then issue that device-specific command to smartphone 120. The thermostat management application executing on smartphone 120 could then cause thermostat 150 to perform the indicated climate change. Alternatively, universal device controller 100 could map the command to a device-specific command associated with thermostat 150 and then issue that device-specific command directly to thermostat 150, without limitation. Universal device controller 100 is configured to select between the two options mentioned above by interacting with user 110 in the fashion discussed below.

In FIG. 5A, when user 110 speaks command 510, "decrease temperature," universal device controller 100 determines that either of smartphone 120 or thermostat 150 is capable of causing the associated operation to be performed. Then, as shown in FIG. 5B, universal device controller 100 generates message 520 that queries user 110 "issue command directly or via smartphone?" In FIG. 5C, user 110 responds with response 530, "directly," indicating to universal device controller 100 that a device-specific command 552 associated with thermostat 150 should be issued directly to thermostat 150.

Referring generally to FIGS. 5A-5C, universal device, controller 100 is configured to learn routing preferences of user 110. In the example discussed in those Figures, universal device controller 100 may record that user 110 prefers climate change commands to be routed directly to thermostat 150 and not routed through smartphone 120. Persons skilled in the art will recognize that the techniques described above may be applicable to a wide variety of different use cases where command routing may be ambiguous, and that the specific use case illustrated in those Figures is provided for exemplary purposes only. Universal device controller 100 is also configured to issue different types of commands to wireless devices 160 depending on the capabilities of those devices, among other things, as described in greater detail below in conjunction with FIGS. 6A-6H.

FIGS. 6A-6H illustrate exemplary use cases where universal device controller of FIG. 1 transmits different types of data to linked devices to initiate device operations, according to various embodiments.

As shown in FIG. 6, universal device controller 100 transmits an activation signal 620 to smartphone 120, a recorded audio sample 630 to computer 130, streamed data 640-0 and 640-1 to vehicle 140, and a device-specific command 650 to thermostat 150. In the exemplary scenario shown in FIG. 6A, each of smartphone 120, computer 130, and thermostat 150 has different capacities to receive and interpret voice commands from user 110, and universal device controller 100 selectively transmits different types of data to those devices depending on those different capacities.

Specifically, smartphone 120 is capable of receiving and interpreting voice commands from user 110 as commands specific to smartphone 120. As such, instead of universal device controller 100 receiving and interpreting a command from user 110, and then transmitting a device-specific command to smartphone 120 in the fashion discussed in conjunction with FIGS. 1-5C, universal device controller 100 need only transmit an activation signal 620 to smartphone 120 when user 110 verbalizes a command intended for smartphone 120. Smartphone 120 may then, once active, simply receive and interpret that command using voice control functionality included in that smartphone (i.e., using the smartphone's built-in microphone and built-in speech recognition functionality to interpret a spoken command from user 110 directly), and initiate a corresponding action. This particular technique is described in greater detail below in conjunction with FIG. 6B.

Computer 130 may also include voice control functionality, in like fashion to smartphone 120 discussed above. However, universal device controller 100 may not be capable of activating computer 130 with sufficient time to receive and interpret a voice command from user 110. Instead, universal device controller 100 records audio sample 630 that reflects a voice command received from user 110, and then forwards that audio sample 630 to computer 120 (i.e., without performing any speech processing). Computer 120 may then receive audio sample 630 and perform speech processing to identify a command specific to computer 120, and then initiate an action corresponding to that device-specific command. This particular technique is described in greater detail below in conjunction with FIG. 6C.

Vehicle 140 may be equipped with varying levels of voice control functionality, and may be capable of receiving streaming data, such as streamed data 640-0 and 640-1, that represents commands associated with an operation to perform. Streamed data 640 could include received voice commands, compressed data, and other information that can be parsed into individual packets for streaming purposes. This particular technique is described in greater detail below in conjunction with FIGS. 6D-6G.

Thermostat 150 may not include voice control functionality or any speech processing capabilities whatsoever, and so universal device controller 100 may simply receive a voice command from user 110, translate that command from the unified command language into device-specific command 650 using an API associated with thermostat 150, and issue device-specific command 650 to thermostat 150 in the fashion previously described. This particular technique is described in greater detail below in conjunction with FIG. 6H.

In operation, universal device controller 100 may rely on any of the aforementioned techniques and, thus, may transmit any of an activation signal, an audio sample, streaming data, and a device-specific command to any of wireless devices 160. In one embodiment, universal device controller 100 determines the capabilities of each wireless device 160 during the discovery process, and then determines a specific approach to controlling each such device. A given approach may rely on transmitting activation signals, voice patterns, or device-specific commands. In another embodiment, universal device controller 100 may be configured to rely on any such approach based on feedback from user 110. For example, and without limitation, universal device controller 100 could generate a query regarding which approach to use when interacting with a given device, and then receive a response from user 110 indicating a preferred approach. Universal device controller 100 could then store that user preference for future interactions with the given device. The different techniques described briefly above are also described in greater detail below in conjunction with FIGS. 6B-6H.

Figure 6A:
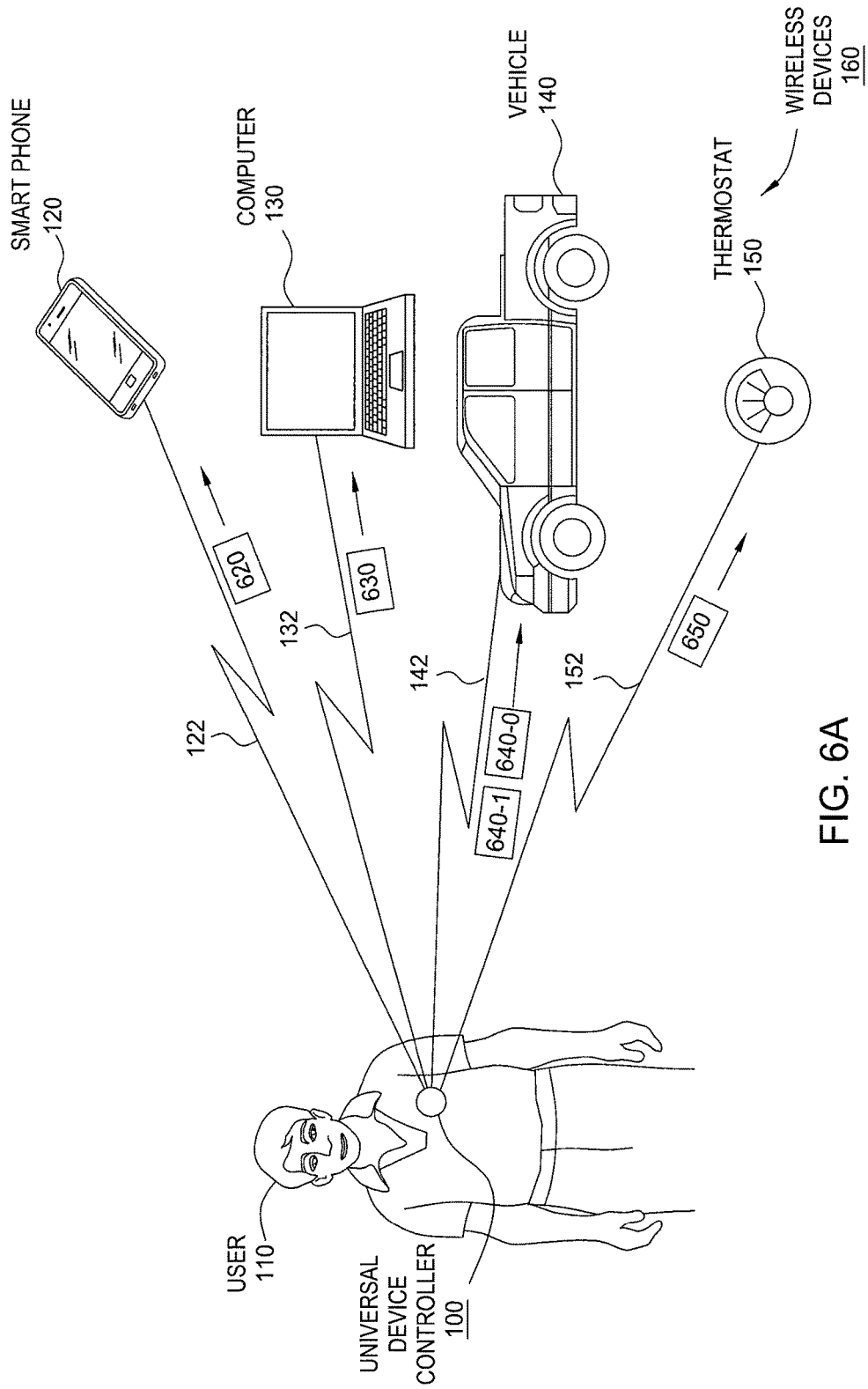
FIGS. 6A-6H illustrate exemplary use cases where universal device controller of FIG. 1 transmits different types of data to linked devices to initiate device operations, according to various embodiments.
Figure 6B:
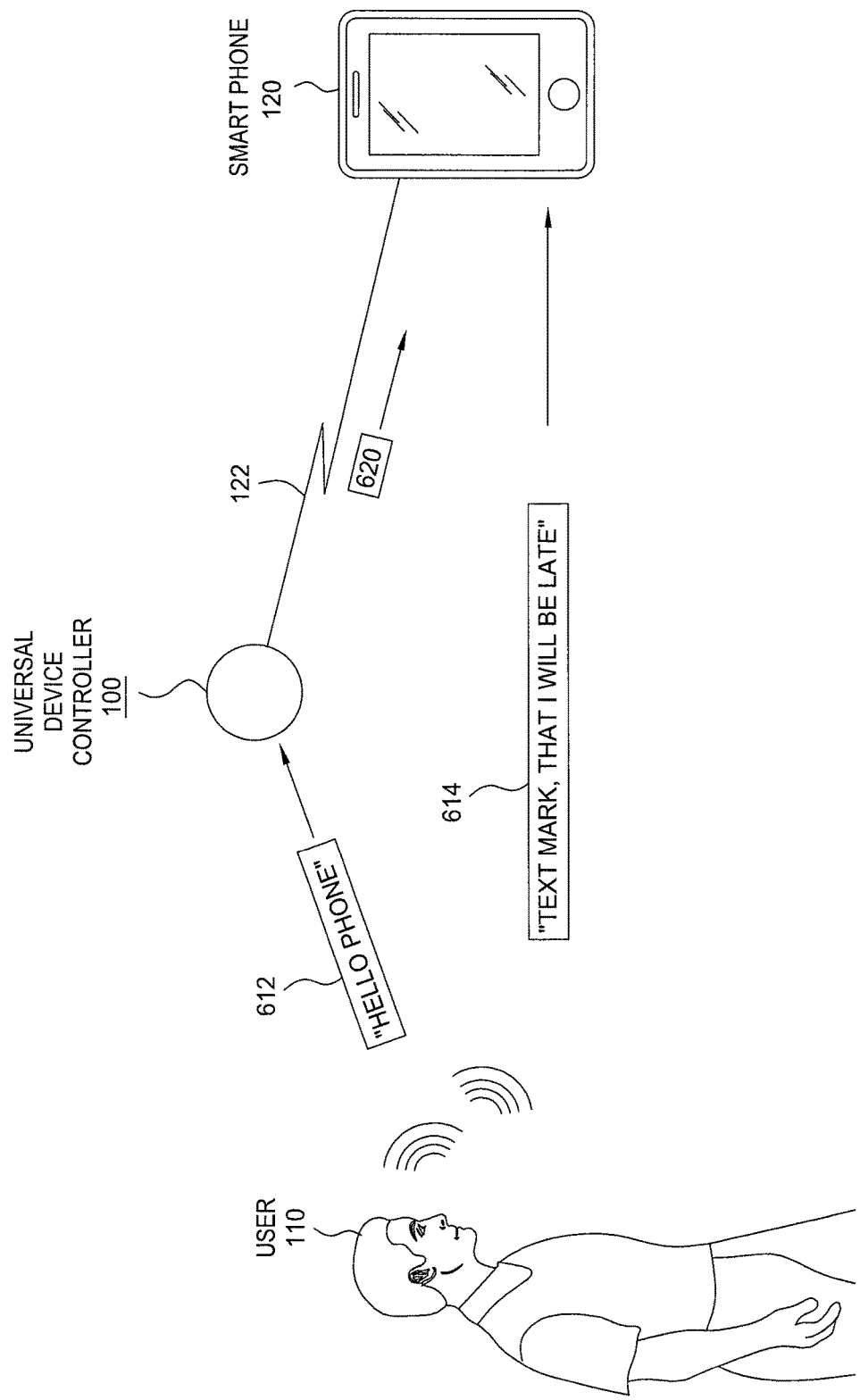

In FIG. 6B, user 110 verbalizes a trigger 612, "hello phone," and a command 614, "text Mark that I will be late." Universal device controller 100 receives trigger 612 and determines that smartphone 120 is capable of interpreting spoken commands via voice control functionality, then issues activation 620 to smartphone 120. Upon receipt of activation 620, smartphone 120 activates a microphone that receives command 614. Smartphone 614 then processes command 614 using speech processing techniques, and performs an action associated with that command. In the example shown in FIG. 6B, smartphone 120 generates a text message to recipient "Mark" indicating that user 110 will be late.

Figure 6C:
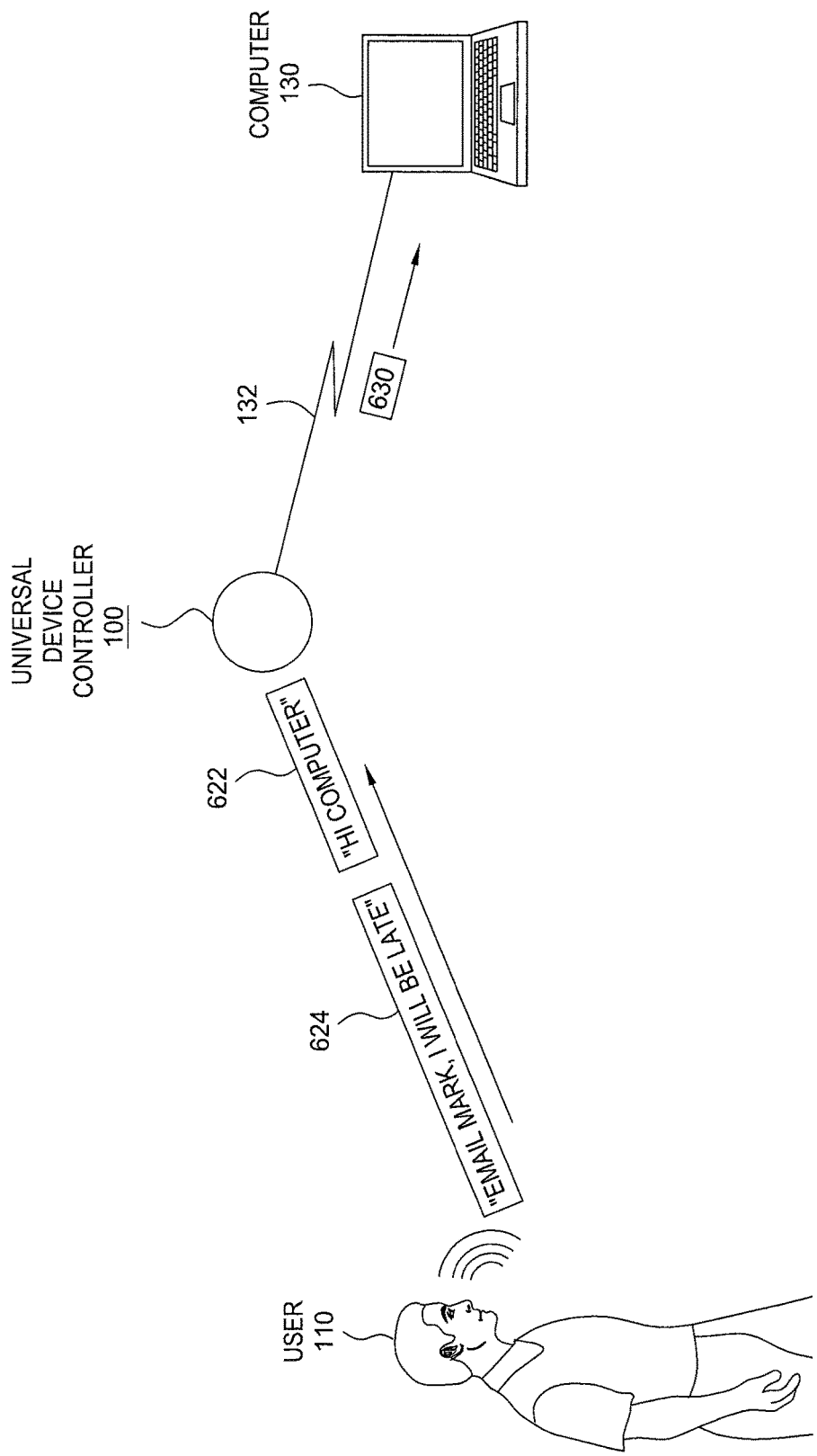

In FIG. 6C, user 110 verbalizes a trigger 622, "hi computer," and a command 624, "email Mark, I will be late." Universal device controller 100 receives trigger 622 and determines that computer 130 should perform a subsequently received command. Upon receiving command 624, universal device controller 100 records an audio sample 630 associated with that command, and then transmits audio sample 630 to computer 130 via wireless connection 132. Computer 130 receives audio sample 630 and then processes that sample, using speech processing techniques, to identify the associated action. In particular, computer 130 determines that an email should be prepared addressed to "Mark" with content indicating that user 110 will be late.

Figure 6D:
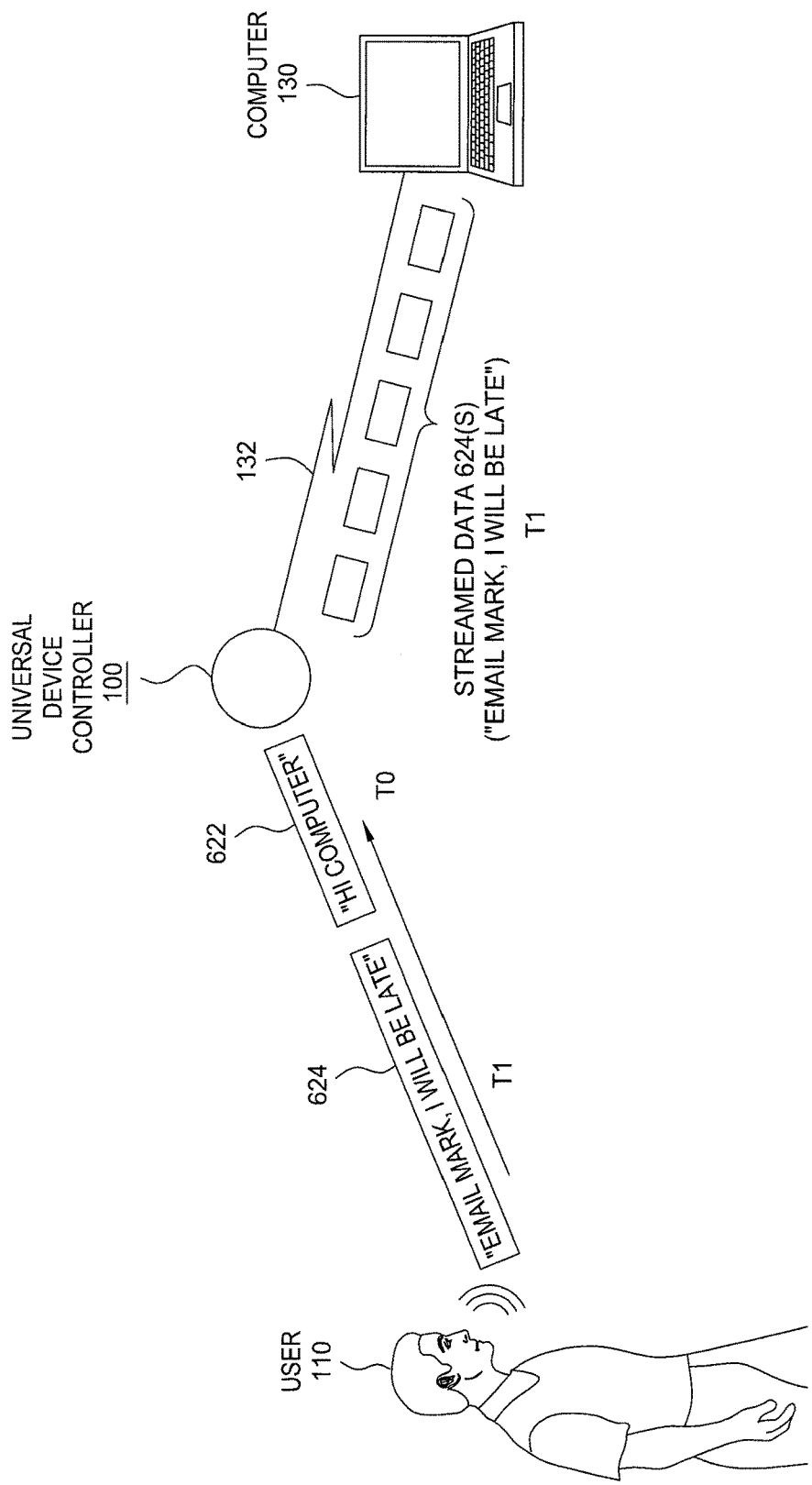

In FIG. 6D, user 110 verbalizes trigger 622, "hi computer," and command 624, "email Mark, I will be late," similar to FIG. 6C. Universal device controller 100 receives trigger 622 at time T0 and determines that computer 130 should perform a subsequently received command. Upon receiving command 624 at subsequent time T1, universal device controller 100 initiates data stream 624(S) that includes command 624 and streams that data to computer 130 at time T1 (or shortly thereafter time T1) via wireless connection 132. Computer 130 receives data stream 624(S). Then, using speech processing techniques, computer 130 identifies an action associated with command 624. In particular, computer 130 determines that an email should be prepared addressed to "Mark" with content indicating that user 110 will be late.

Figure 6E:
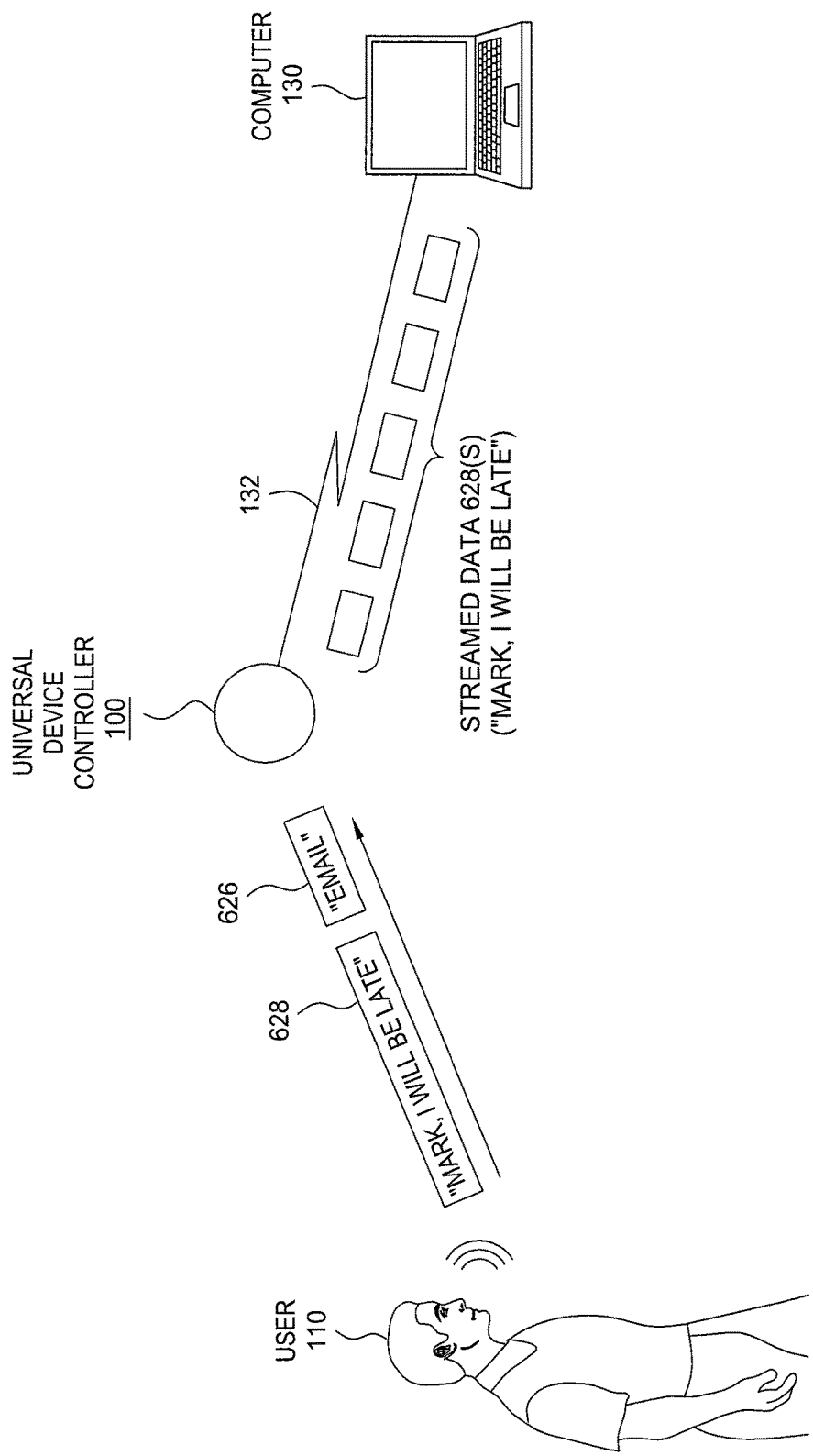

In FIG. 6E, user 110 verbalizes a command, "email Mark, I will be late" that can be parsed into two portions, portion 626, "email," and portion 628, "Mark, I will be late." Although user 110 does not explicitly indicate a particular device to perform an action associated with the command, universal device controller 100 infers, based on portion 626 ("email") that computer 130 should perform that action. Universal device controller 100 may then issue a device-specific command (not shown) to computer 120 to prepare an email (e.g., via API calls to computer 130 using device APIs 246) with subsequently streamed data. While receiving portion 628, universal device controller 100 initiates data stream 628(S) that reflects portion 628, and streams that data to computer 130 across wireless connection 132. Computer 130 receives data stream 628(S), applies speech recognition processes, and composes the email using the content of portion 628 and transmits that email to the recipient ("Mark").

Figure 6F:
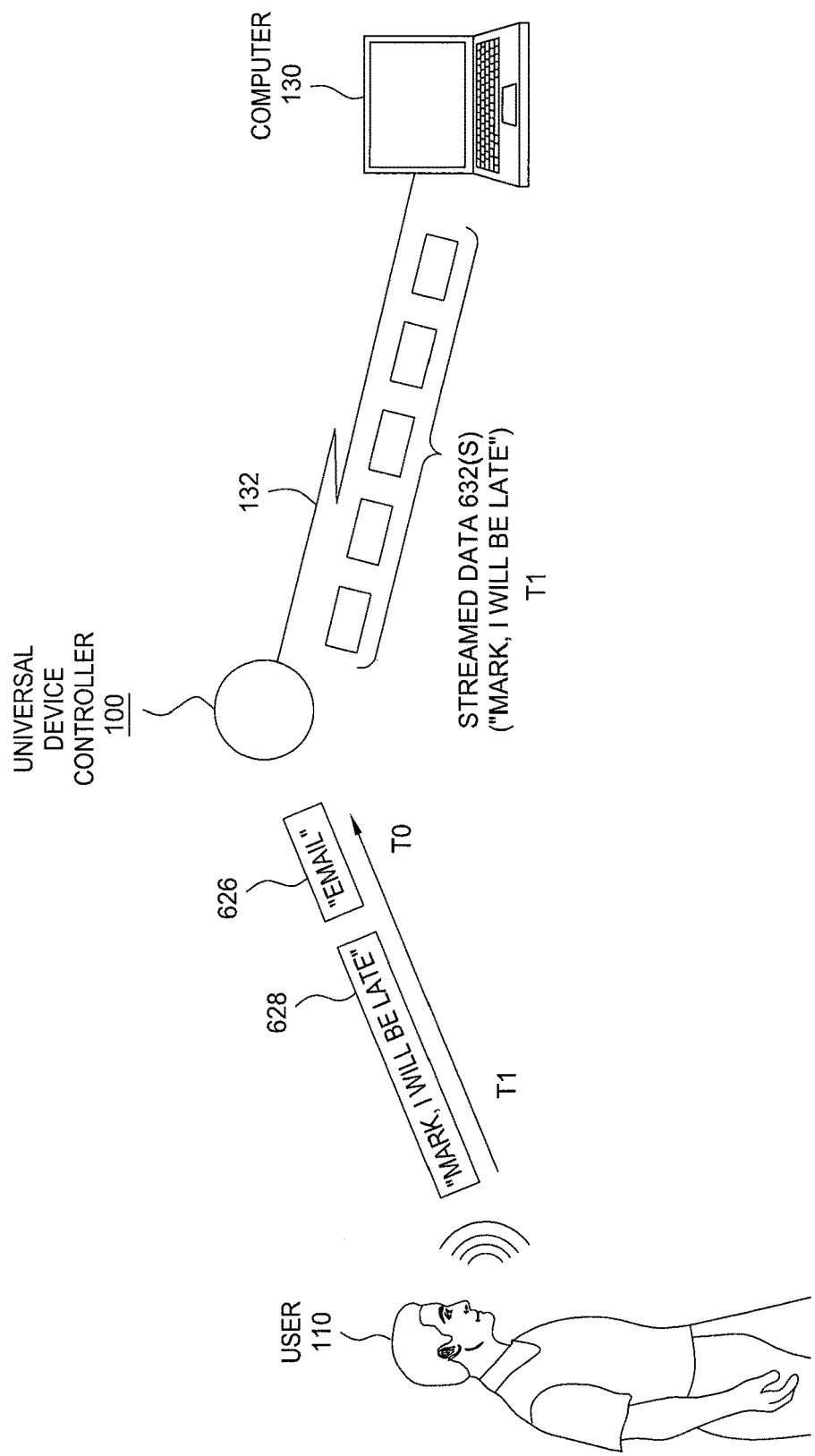

In FIG. 6F, like FIG. 6E, user 110 verbalizes a command, "email Mark, I will be late" that can be parsed into two portions, portion 626, "Email," and portion 628, "Mark, I will be late." Universal device controller 100 receives portion 626 at time T0, and portion 628 and time T1. Universal device controller 100 infers, based on portion 626 ("email"), that computer 130 should perform the associated action. Upon receipt of portion 628, universal device controller 100 initiates data stream 632(S) at time T1 that includes both portions 626 and 628. Universal device controller 100 then streams that data to computer 130 at time T1 across wireless connection 132. The streaming is done with a temporal delay resulting from the need to parse portion 626 first and determining that computer 130 should perform the associated action. Due to this temporal delay, portion 628 is routed through a FIFO (first in first out) buffer on the universal device controller. Computer 130 receives data stream 632(S) and, using speech processing techniques, determines that an email should be prepared addressed to "Mark" with content indicating that user 110 will be late.

Figure 6G:
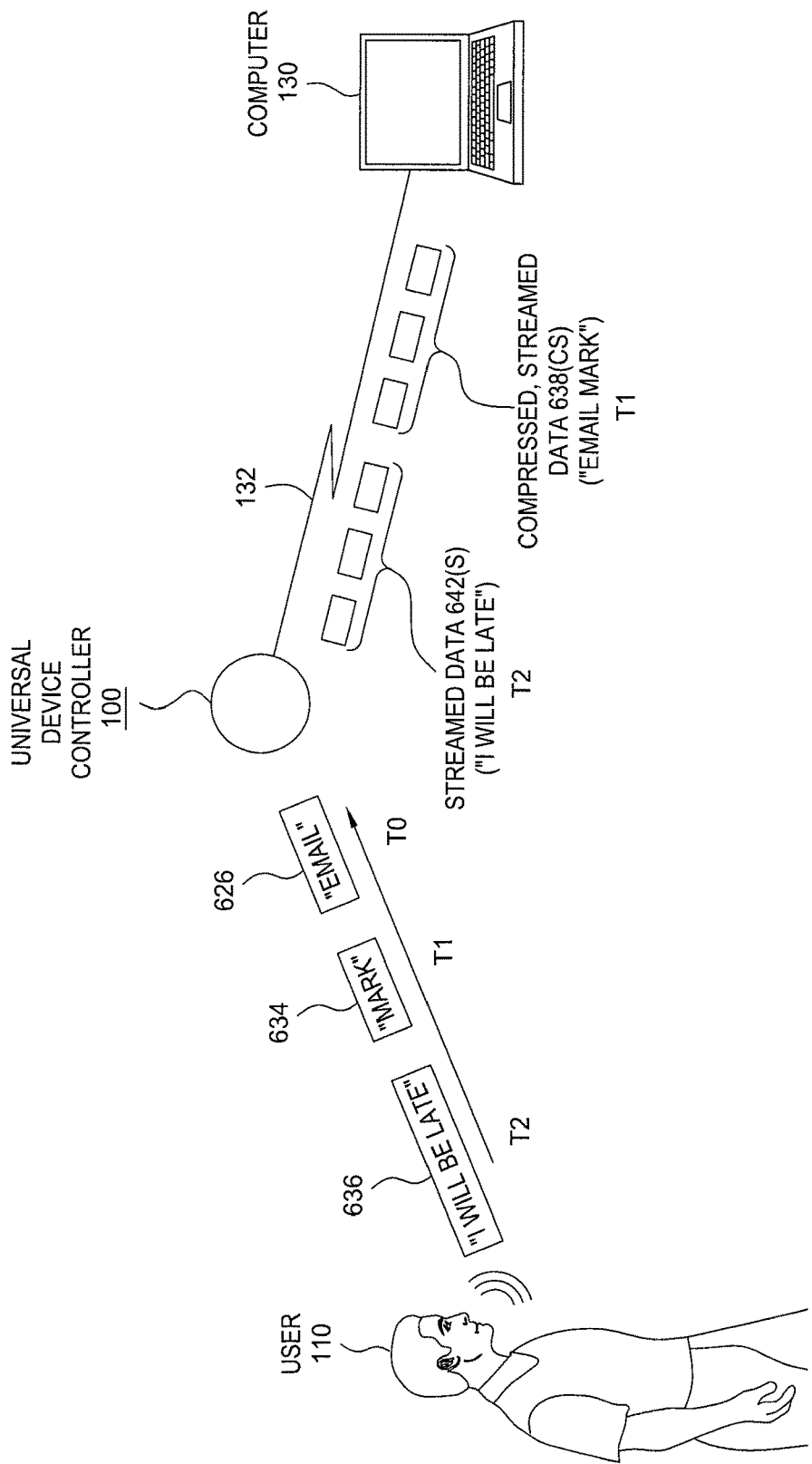

In FIG. 6G, like FIGS. 6E-6F, user 110 verbalizes a command, "email Mark, I will be late." However, in FIG. 6G, that command can be parsed into three portions, portion 626, "email," portion 634, "Mark," and portion 636, "I will be late." Universal device controller 100 receives portion 626 at time T0, portion 634 and time T1, and portion 636 at time T2. Universal device controller 100 infers, based on portion 626 ("email"), that computer 130 should perform the associated action. Upon receipt of portion 634 at time T1, universal device controller 100 initiates a temporally compressed data stream 638(CS) that includes both portions 626 and 634. Universal device controller 100 then streams that data to computer 130 at time T1 (or shortly thereafter) across wireless connection 132.

Since temporally compressed data stream portion 638(CS) is significantly shorter than the concatenated portions 626 and 634, all data associated with both portions 626 and 634 can be streamed between time T1 and time T2. In other words, the temporally compressed data stream portion 638(CS) ("email Mark") may have approximately the same duration as the original portion 634 ("Mark") by itself.

Universal device controller 100 then generates data stream portion 642(S), which reflects portion 636, and streams that data to computer 130 at time T2 across wireless connection 132, thereby becoming synchronized at time T2 with the original command (catching up) and compensating for the time needed to identify which wireless device 160 should perform the action associated with the command. Computer 130 receives temporally compressed streamed data 638(CS) and, immediately following, uncompressed data stream 642(S). Using speech processing techniques, computer 130 determines that an email should be prepared addressed to "Mark" with content indicating that user 110 will be late. Due to temporal compression of portions 626 and 634, the user saying their last word (" . . . late") and the computer receiving this last word (" . . . late") will temporally coincide (not taking into account an insignificantly small delay due to the wireless data transmission).

Figure 6H:
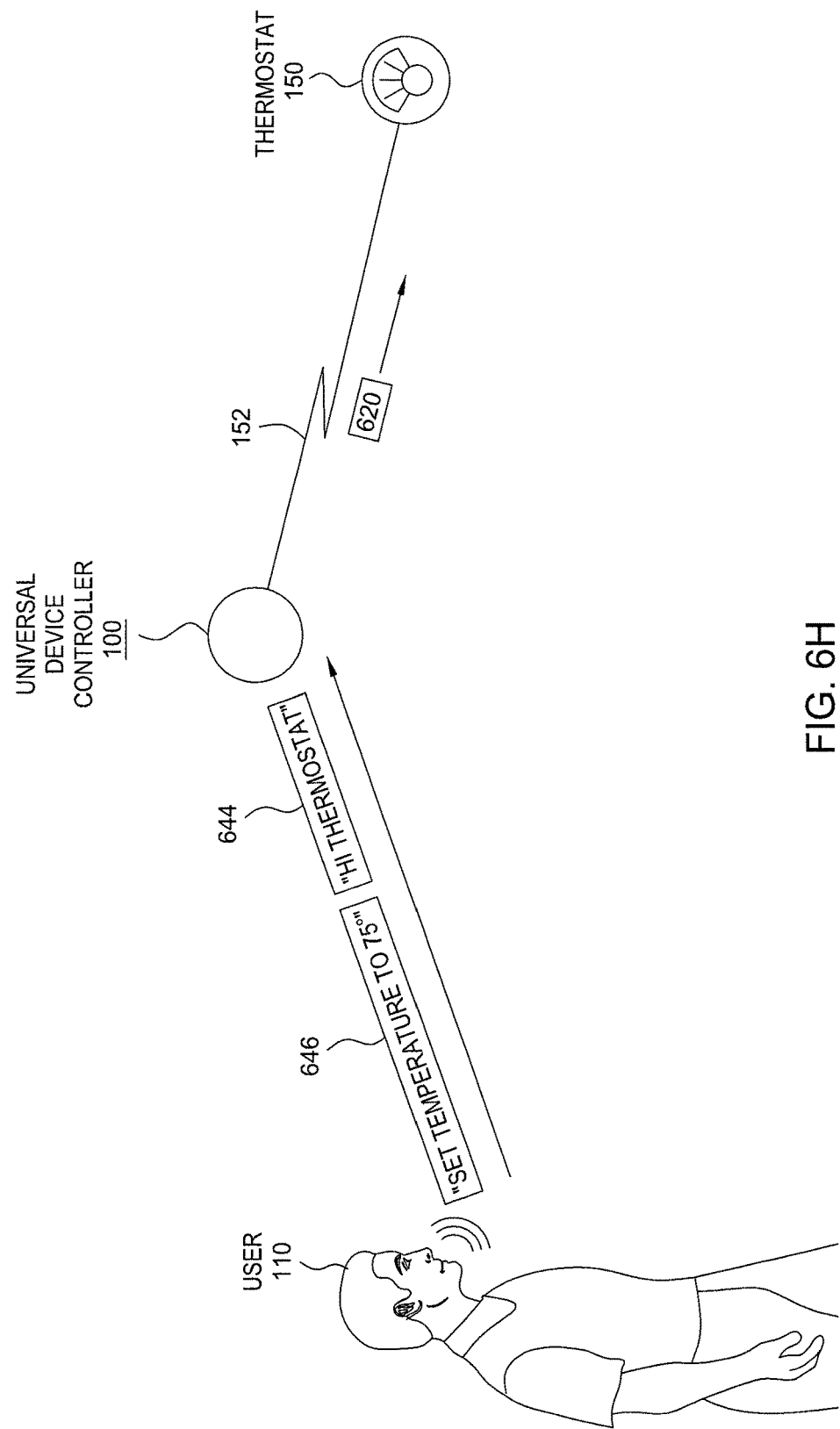

In FIG. 6H, user 110 verbalizes trigger 644, "hi thermostat," and command 646, "set temperature to 75 degrees." Upon receipt of trigger 644, universal device controller 100 determines that thermostat 150 lacks voice control functionality, and should be controlled via API calls. Universal device controller 100 then receives command 646 and, by implementing the approach described above in conjunction with FIG. 2B, maps that command to a device-specific command 620. Universal device controller 100 then issues that command via wireless link 152 to thermostat 150, thereby causing thermostat 150 to be set to 75 degrees.

Persons skilled in the art will understand that the exemplary use-case scenarios described above in conjunction with FIGS. 6A-6H are provided for exemplary purposes only to illustrate different techniques universal device controller 100 may implement to control wirelessly linked devices. Further, the examples discussed above, although presented with reference to specific commands, devices, and operations, are not meant to limit the scope of the invention to those specificities.

Referring generally to FIGS. 1-6H, universal device controller 100 is configured to manage wireless devices 160 coupled thereto by acting as an intermediary or proxy for those devices. By implementing the functionality described thus far, universal device controller 100 may improve the usability of wireless devices 100 as well as user experience relative to those devices. The techniques described above in conjunction with FIGS. 1-6 are also described, in stepwise fashion, below in conjunction with FIGS. 7-8.

Exemplary Algorithms Implemented by Universal Device Controller

Figure 7:
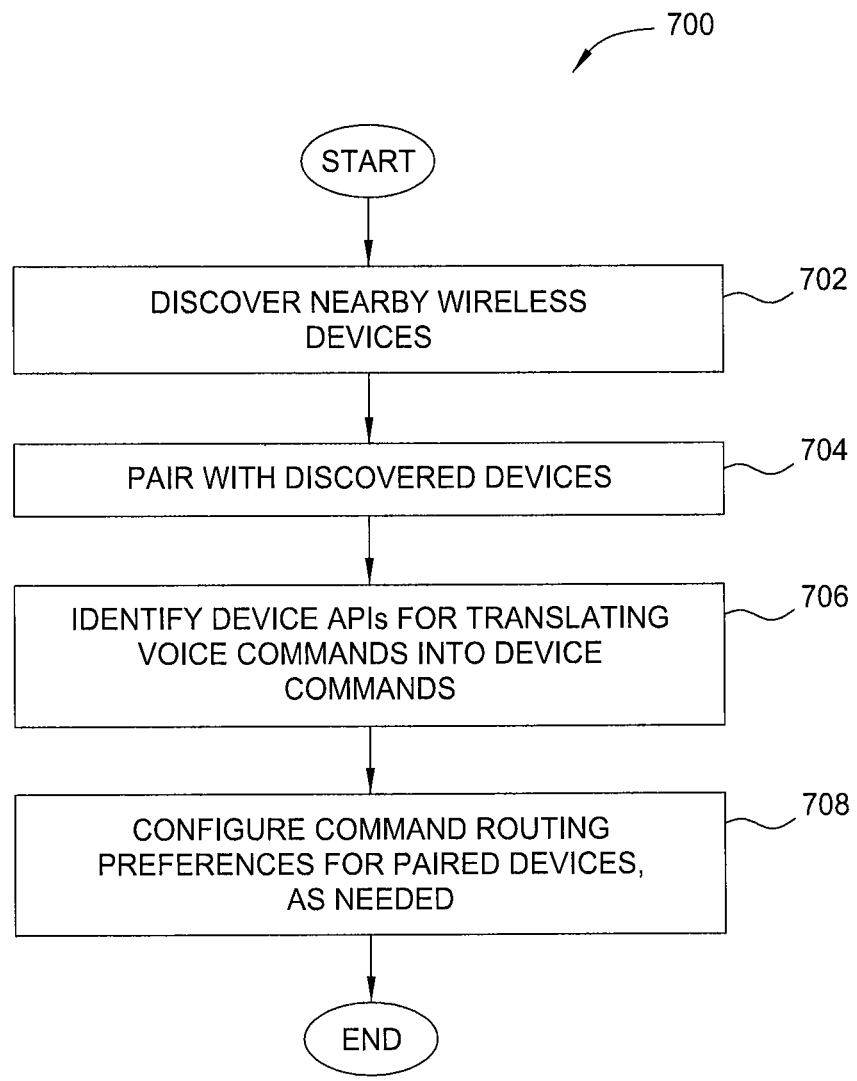
FIG. 7 is a flow diagram of method steps for initializing and configuring the universal device controller of FIG. 1, according to various embodiments.

FIG. 7 is a flow diagram of method steps for initializing and configuring the universal device controller of FIG. 1, according to various embodiments. Although the method steps are described in conjunction with the systems of FIGS. 1-6, persons skilled in the art will understand that any system configured to perform the method steps, in any order, is within the scope of the present invention.

As shown, a method 700 begins at step 702, where universal device controller 100 discovers nearby wireless devices. Universal device controller 100 may perform any technically feasible form of device discovery, including, and without limitation, locating a WiFi™ access point and then identifying other devices coupled thereto, interacting directly with nearby Bluetooth devices, or performing generic handshaking with wireless devices using RF signals. In performing device discovery at step 702, universal device controller 100 is configured to obtain device information from each discovered device that reflects, among other things, device capabilities. The capabilities could include, for example, and without limitation, a preferred wireless connection protocol (e.g., WiFi™, Bluetooth, without limitation), a level of voice control functionality, and so forth. Other device information could include, for example, and without limitation, a device position, a device battery level, etc.

At step 704, universal device controller 100 pairs with one or more of the discovered devices. In doing so, universal device controller 100 may rely on any relevant protocol. In addition, universal device controller 100 may pair with different devices that rely on different protocols.

At step 706, universal device controller 100 identifies device APIs for translating voice commands into commands specific to the paired devices. Device APIs could be, for example, and without limitation, device APIs 246 shown in FIGS. 2A-2B. Generally, device APIs allow universal device controller 100 to translate a command in unified command language 244 also shown in FIGS. 2A-2B into a command specific to a given device.

Figure 8:
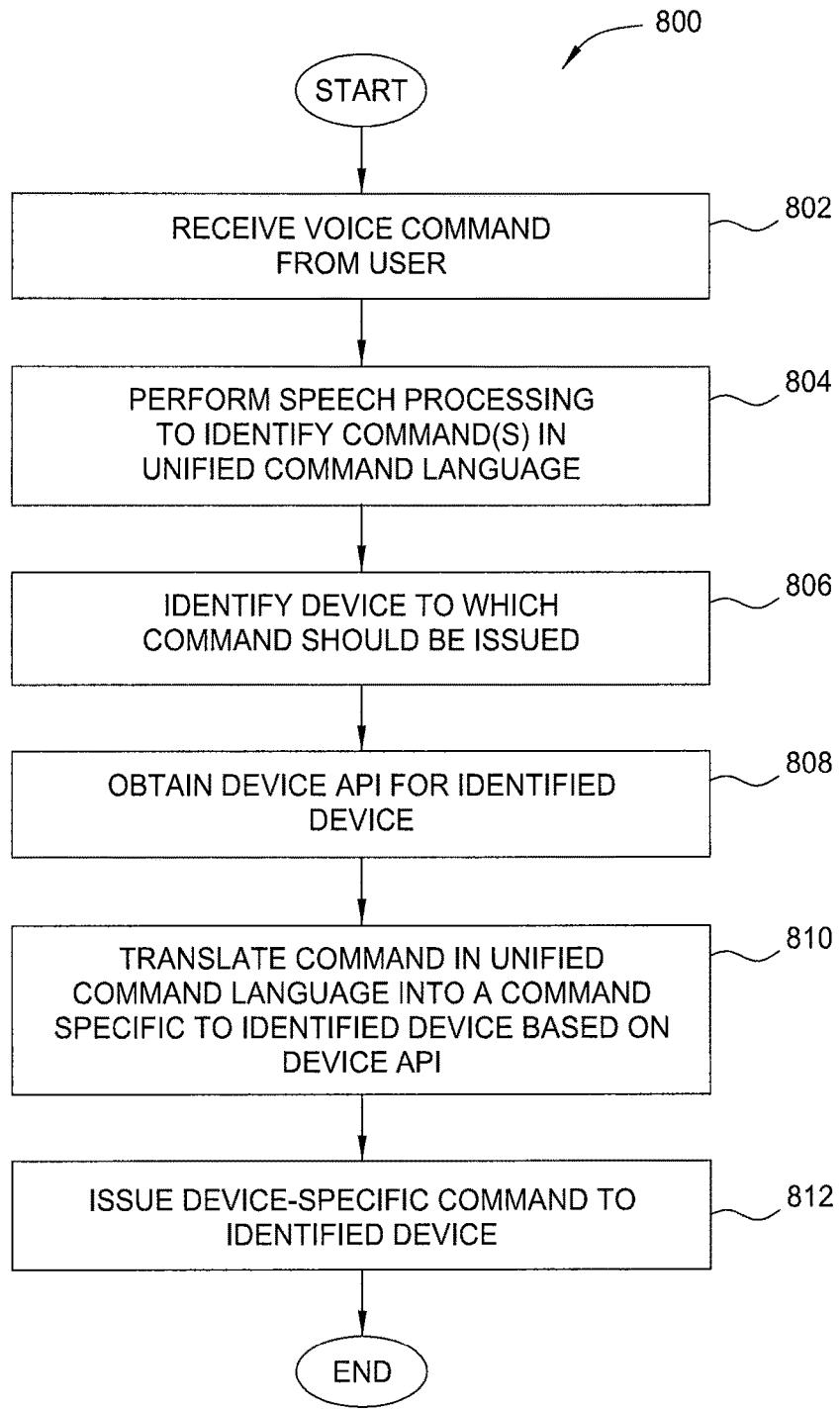
FIG. 8 is a flow diagram of method steps for issuing a command to a linked device based on a voice command received from a user of the universal device controller of FIG. 1, according to various embodiments.

At step 708, universal device controller 100 configures command routing preferences for paired devices, as needed. In doing so, universal device controller 100 may interact with user 110 in order to disambiguate between multiple devices capable of performing an operation associated with a command verbalized by user 110, in the fashion discussed above in conjunction with FIGS. 4A-4D. Alternatively, universal device controller 100 may determine whether a command should be routed through a master device or issued directly to a slave device, in the fashion discussed above in conjunction with FIGS. 5A-5C. In general, universal device controller may perform step 708 in an ongoing fashion, i.e. during normal operation of universal device controller 100, in order to continuously learn the preferences of user 110. FIG. 8, discussed below, describes the normal operation of universal device controller 100 in stepwise fashion.

FIG. 8 is a flow diagram of method steps for issuing a command to a linked device based on a voice command received from a user of the universal device controller of FIG. 1, according to various embodiments. Although the method steps are described in conjunction with the systems of FIGS. 1-6, persons skilled in the art will understand that any system configured to perform the method steps, in any order, is within the scope of the present invention.

As shown, a method 800 begins at step 802, where universal device controller 100 receives a voice command from user 110. The voice command may be specific by unified command language 244 shown in FIGS. 2A-2B. In one embodiment, universal device controller 100 may also receive an expression of a state of being associated with user 110 at step 802.

At step 804, universal device controller 100 processes the voice command received at step 802 to identify a corresponding command in unified command language 244 of FIGS. 2A-2B. Universal device controller 100 may rely on any technically feasible form of speech processing in order to map a recorded audio pattern associated with the voice command to a command within unified command language 244. In embodiments where universal device controller 100 receives an expression of a state of being at step 802, universal device controller 100 may be configured to map that expression to a command in unified command language 244.

At step 806, universal device controller 100 identifies one of wireless devices 160 to which a device-specific command, corresponding to the command in the unified command language, should be issued. In doing so, universal device controller 100 may determine that the voice command received at step 802 explicitly indicates a particular wireless device, as described above in conjunction with FIGS. 3A-3C. Additionally, universal device controller 100 may also identify the particular wireless device by interacting with user 110, as described above in conjunction with FIGS. 4A-4C. Further, universal device controller 100 may automatically disambiguate between different devices in order to determine one wireless device to which the command should be issued, as described above in conjunction with FIG. 4D.

At step 808, universal device controller 100 obtains a device API for the wireless device identified at step 806. The device API could be, e.g., one of device APIs 246 shown in FIGS. 2A-2B. The device API for the identified device includes a set of device-specific commands that the identified device may execute to perform a desired operation reflected by the voice command received from user 110 at step 802. At step 810, universal device controller 100 translates the command in the unified command language to a device-specific command based on the device API obtained at step 810. At step 812, universal device controller 100 issues the device-specific command to the wireless device to cause that device to perform the desired operation.

In sum, a universal device controller is configured to operate as a proxy mechanism for interacting with a plurality of different devices wirelessly coupled to the universal device controller. When a user of the universal device controller verbally expresses a command from a universal command language understood by the device, the universal device controller analyzes the verbal expression of the user and identifies a wireless device capable of executing the associated command. The universal device controller then identifies an API for interacting with the identified device and translates the verbal expression into a device command that the identified device is capable of executing. The universal device controller then issues the device command to the identified device.

In one embodiment, universal device controller 100 is configured to interact with types of devices that lack wireless connectivity via an intermediary device. For example, and without limitation, universal device controller 100 could be wirelessly coupled to an aerial robotics platform (such as a drone), or any other type of autonomous robotic entity configured to perform various physical actions, including manipulating devices that lack wireless capability. A drone could, e.g., press buttons on an older microwave oven, without limitation. Persons skilled in the art will recognize that any type of robotic entity may be wirelessly coupled to universal device controller 100 and configured to interact with any other type of device on behalf on universal device controller 100 and user 110.

At least one advantage of the approach described herein is that the user of the universal device controller need only remember commands from the universal command language in order to interact with any number of different devices. Accordingly, the user is not required to remember a different command language for each different voice-enabled, wireless device. In addition, the universal device controller allows the user to verbally interact with devices that do not implement voice control, thus broadening the set of devices to which the unified command language is applicable. Further, the set of devices to which the unified command language is applicable may include devices programmed to operate in a foreign language that is unknown to the user. In such cases, the universal device controller translates spoken commands into commands that such devices can recognize.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A non-transitory computer-readable medium storing program instructions that, when executed by a processing unit, cause the processing unit to translate verbal expressions into commands for a plurality of devices, by performing the steps of:
    processing a first verbal expression to identify a subset of devices included in the plurality of devices that are each capable of performing a first operation associated with the first verbal expression;
    disambiguating the subset of devices to identify a first device;
    translating the first verbal expression to generate a first command that corresponds to the first operation, wherein the first command is included in a first set of commands associated with the first device; and
    transmitting the first command across a wireless connection to the first device to cause the first device to perform the first operation.

2. The non-transitory computer-readable medium of claim 1, wherein the first verbal expression includes either an indication of the first operation or indications of both the first device and the first operation.

3. The non-transitory computer-readable medium of claim 1, wherein the first verbal expression reflects a state of a particular user, and the step of processing the first verbal expression comprises determining that the first device is capable of influencing the state of the particular user.

4. The non-transitory computer-readable medium of claim 1, wherein disambiguating the subset of devices comprises processing a second verbal expression to distinguish the first device from other devices in the subset of devices.

5. The non-transitory computer-readable medium of claim 1, wherein disambiguating the subset of devices comprises identifying the first device as a device included in the subset of devices that resides closest to the user.

6. The non-transitory computer-readable medium of claim 1, further comprising the steps of:
    performing a discovery process to identify the plurality of devices;
    performing a pairing process with the first device to establish the wireless connection with the first device; and
    querying the first device to identify the first set of commands, wherein the first set of commands are included in an application programming interface associated with the first device.

7. A computer-implemented method for translating verbal expressions into commands for a plurality of devices, the method comprising:
    processing a first verbal expression to identify a subset of devices included in the plurality of devices that are each capable of performing a first operation associated with the first verbal expression;
    disambiguating the subset of devices to identify a first device;
    translating the first verbal expression to generate a first command that corresponds to the first operation, wherein the first command is included in a first set of commands associated with the first device; and
    transmitting the first command across a wireless connection to the first device to cause the first device to perform the first operation.

8. The computer-implemented method of claim 7, wherein the first verbal expression includes a first device command that indicates the first device in the plurality of devices.

9. The computer-implemented method of claim 7, wherein the first verbal expression includes a first device command that is associated with the first device in the plurality of devices and associated with a second device included in the plurality of devices.

10. The computer-implemented method of claim 7, wherein disambiguating between devices in the subset of devices comprises generating a prompt to select the first device included in the subset of devices.

11. The computer-implemented method of claim 7, wherein disambiguating between devices in the subset of devices comprises measuring the distance between a user and each device in the subset of devices to identify that the first device is closest to the user.

12. The computer-implemented method of claim 7, further comprising:
    discovering the plurality of devices;
    pairing with the first device to establish the wireless connection with the first device; and
    obtaining a set of device parameters associated with the first device that reflect one or more functionalities associated with the first device.

13. A computing device configured to translate verbal expressions into commands for a plurality of devices, comprising:
    a transducer configured to transduce verbal expressions;
    a processor coupled to the transducer and configured to:
        process a first verbal expression transduced by the transducer to identify a subset of devices included in the plurality of devices that are each capable of performing a first operation associated with the first verbal expression,
        disambiguate the subset of devices to identify a first device, and
        translate the first verbal expression to generate a first command included in a set of commands associated with first device, wherein the first command reflects the first verbal expression, and a wireless transceiver, configured to issue the first command to the first device to cause the first device to perform a first operation associated with the first command.

14. The computing device of claim 13, wherein the processor is configured to disambiguate the subset of devices by processing a second verbal expression to distinguish the first device from other devices in the subset of devices.

15. A computer-implemented method for translating verbal expressions into commands for a plurality of devices, the method comprising:

processing a first verbal expression to identify a first device included in the plurality of devices that is capable of initiating a first operation associated with the first verbal expression;

translating the first verbal expression to generate a first command that corresponds to the first operation, wherein the first command is included in a first set of commands associated with the first device;

transmitting the first command across a wireless connection to the first device to cause the first device to initiate the first operation, wherein transmitting the first command comprises:

receiving a second verbal expression indicating that the first operation should be performed by a second device that is managed by the first device; and causing the first device, in response to the first command, to cause the second device to perform the first operation.

16. The computer-implemented method of claim 15, further comprising recording a preference that the first device, upon receiving a command, should cause the second device to perform an operation associated with the command.

* * * * *